(12) United States Patent
Christie et al.

(10) Patent No.: US 6,480,493 B1
(45) Date of Patent: *Nov. 12, 2002

(54) SYSTEM FOR MANAGING TELECOMMUNICATIONS

(75) Inventors: Joseph Michael Christie, San Bruno, CA (US); Bobby Chand Bahl, Hillsborough, CA (US); Albert Daniel Duree, Independence, MO (US); Michael Joseph Gardner, Overland Park, KS (US); Daniel Charles Sbisa, Blue Springs, MO (US); William Lyle Wiley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/276,217

(22) Filed: Mar. 25, 1999

Related U.S. Application Data

(63) Continuation of application No. 08/525,050, filed on Sep. 8, 1995, now Pat. No. 6,181,703, which is a continuation-in-part of application No. 08/238,605, filed on May 5, 1994, now abandoned.

(51) Int. Cl.[7] .............................. H04L 12/66; H04J 3/12
(52) U.S. Cl. .................. 370/395.2; 370/410; 370/466; 370/524; 370/286; 379/230; 379/114.06; 379/406.06
(58) Field of Search ................................. 370/264, 270, 370/282, 286, 287, 384, 389, 410, 522, 524, 351–360, 395–399, 465–467, 474, 395.2, 395.3; 379/219, 220, 230, 207, 127, 229, 344, 345, 406, 410, 114.06, 406.06

(56) References Cited

U.S. PATENT DOCUMENTS

| | | | |
|---|---|---|---|
| 4,201,889 A | 5/1980 | Lawrence et al. |
| 4,348,554 A | 9/1982 | Asmuth |
| 4,453,247 A | 6/1984 | Suzuki et al. |
| 4,720,850 A | 1/1988 | Oberlander et al. |
| 4,748,658 A | 5/1988 | Gopal et al. |

(List continued on next page.)

OTHER PUBLICATIONS

McDysan, David E. and Spohn, Darren L., ATM Theory and Application, 1994, p. 256: 9.3.1; ATM Layer VPI/VCI Level Addressing.

Ohta, S., et al., A Dynamically Controllable ATM Transport Network Based On The Virtual Path Concept, pp. 1272–1276, Communications For The Information Age, Globecom '88, Conference Record, vol. III, Nov. 28–Dec. 1, 1988.

Chiang, "Proposed Changes To Proxy Signaling Capability", ATM Forum Signaling Working Group 95–0046, Feb. 6–10, 1995.

(List continued on next page.)

*Primary Examiner*—Seema S. Rao
(74) *Attorney, Agent, or Firm*—Harley R. Ball; Steven J. Funk; Kevin D. Robb

(57) ABSTRACT

The invention includes a system for processing telecommunications signaling. Signaling for a call is received into a signaling processor. The signaling processor processes the call and generates new signaling incorporating the processing. The new signaling is transferred to network elements as appropriate. The signaling processor is not coupled to a switch matrix and only communicates with the network elements over signaling links.

32 Claims, 10 Drawing Sheets

U.S. PATENT DOCUMENTS

| | | | |
|---|---|---|---|
| 4,763,317 A | 8/1988 | Lehman et al. | |
| 4,926,416 A | 5/1990 | Weik et al. | |
| 5,003,584 A | 3/1991 | Benyacar et al. | |
| 5,051,983 A | 9/1991 | Kammerl | |
| 5,067,123 A | 11/1991 | Hyodo et al. | |
| 5,084,867 A | 1/1992 | Tachibana et al. | |
| 5,089,954 A | 2/1992 | Rago | |
| 5,179,556 A | 1/1993 | Turner | |
| 5,204,857 A | 4/1993 | Obara | |
| 5,218,602 A | 6/1993 | Grant et al. | |
| 5,251,255 A | 10/1993 | Epley | |
| 5,255,266 A | 10/1993 | Watanabe et al. | |
| 5,291,492 A | 3/1994 | Andrews et al. | |
| 5,327,421 A | 7/1994 | Hiller et al. | |
| 5,339,318 A | 8/1994 | Tanaka et al. | |
| 5,345,445 A | 9/1994 | Hiller et al. | |
| 5,345,446 A | 9/1994 | Hiller et al. | |
| 5,363,433 A | 11/1994 | Isono | |
| 5,365,524 A | 11/1994 | Hiller et al. | |
| 5,384,771 A | 1/1995 | Isidoro et al. | |
| 5,392,402 A | 2/1995 | Robrock, II | |
| 5,414,701 A | 5/1995 | Shtayer et al. | |
| 5,420,857 A | 5/1995 | Jurkevich | |
| 5,420,858 A | 5/1995 | Marshall et al. | |
| 5,422,882 A | 6/1995 | Hiller et al. | |
| 5,426,636 A | 6/1995 | Hiller et al. | |
| 5,428,607 A | 6/1995 | Hiller et al. | |
| 5,428,609 A | 6/1995 | Eng et al. | |
| 5,434,852 A | 7/1995 | La Porta et al. | |
| 5,434,981 A | 7/1995 | Lenihan et al. | |
| 5,446,738 A | 8/1995 | Kim et al. | |
| 5,452,296 A | 9/1995 | Shimizu | |
| 5,452,297 A | 9/1995 | Hiller et al. | |
| 5,459,722 A | 10/1995 | Sherif | |
| 5,461,669 A | 10/1995 | Vilain | |
| 5,473,677 A | 12/1995 | D'Amato et al. | |
| 5,473,679 A | 12/1995 | LaPorta et al. | |
| 5,483,527 A | 1/1996 | Doshi et al. | |
| 5,495,484 A | 2/1996 | Self et al. | |
| 5,504,742 A | 4/1996 | Kakuma | |
| 5,509,010 A | 4/1996 | La Porta et al. | |
| 5,513,178 A | 4/1996 | Tanaka | |
| 5,530,724 A | 6/1996 | Abrams et al. | |
| 5,539,815 A | 7/1996 | Samba | |
| 5,539,884 A | 7/1996 | Robrock, II | |
| 5,541,926 A | 7/1996 | Saito et al. | |
| 5,544,152 A | 8/1996 | Obermanns et al. | |
| 5,544,161 A | 8/1996 | Bigham et al. | |
| 5,550,819 A | 8/1996 | Duault | |
| 5,563,939 A | 10/1996 | LaPorta et al. | |
| 5,568,475 A | 10/1996 | Doshi et al. | |
| 5,570,368 A | 10/1996 | Murakami et al. | |
| 5,600,640 A | 2/1997 | Blair et al. | |
| 5,600,643 A | 2/1997 | Robrock II | |
| 5,623,491 A | 4/1997 | Skoog | |
| 5,623,493 A | 4/1997 | Kagemoto | |
| 5,627,836 A | 5/1997 | Conoscenti et al. | |
| 5,636,210 A | 6/1997 | Agrawal et al. | |
| 5,673,262 A | 9/1997 | Shimizu | |
| 5,680,390 A | 10/1997 | Robrock, II | |
| 5,684,792 A | 11/1997 | Ishihara | |
| 5,703,876 A | 12/1997 | Christie | |
| 5,787,086 A | 7/1998 | McClure et al. | |
| 5,825,780 A | 10/1998 | Christie | |
| 5,835,584 A | 11/1998 | Penttonen | |
| 5,844,895 A | 12/1998 | Gradisching | |
| 5,878,029 A | 3/1999 | Hasegawa et al. | |
| 5,991,301 A | 11/1999 | Christie | |
| 6,016,343 A | 1/2000 | Hogan et al. | |
| 6,081,525 A | * 6/2000 | Christie et al. | 370/410 |
| 6,108,341 A | * 8/2000 | Christie et al. | 370/410 |
| 6,115,380 A | * 9/2000 | Christie et al. | 370/410 |
| 6,181,703 B1 | 1/2001 | Christie et al. | |
| 6,192,052 B1 | * 2/2001 | Christie | 370/410 |
| 6,208,660 B1 | 3/2001 | Christie | |
| 6,212,193 B1 | 4/2001 | Christie | |

OTHER PUBLICATIONS

Amin–Salehi, "Third Party Call Setup For A Video–On–Demand Connection Establishment", ATM Forum Technical Committee 95–0022, Feb. 5–8, 1995.

"ATM At A Glance," Transmission Technologies Access Guide, pp. 40–42, 1993.

Andrews, F., "Switching In A Competitive Market," IEEE Communications Magazine, Jan–91.

Atoui, M., "Virtual Private Network Call Processing In The Intelligent Network," pp. 561–565, Chicago, IL, International Conference on Communications, vol. II., 1992.

Barr, W.J., et al., The TINA Initiative, IEEE Communications Magazine, vol. 31, No. 3, New York (US), pp. 70–76, Mar. 1993.

Weisser, F.J., et al., The intelligent Network And Forward–Looking Technology, IEEE Communications Magazine, vol. 26, No. 12, Dec. 1988, New York (US), pp. 64–69, Dec. 1988.

"IN/B–ISDN Signaling Three Ways Of Integration," Study Group 11, Geneva, ITU–Telecommunication Standardization Sector, Nov. 29 —Dec. 17, 1993.

"Chapter 6 Of Recommendation Q.93B," Study Group 11, ITU—Telecommunication Standardization Sector, Nov. 29–Dec. 17, 1993.

General Recommendations On Telephone Switching And Signaling Intelligent Network–Intelligent Network Distributed Functional Plane Architecture, Q. 1204, ITU–T—Mar. 1993.

General Recommendations On Telephone Switching And Signaling Intelligent Network–Intelligent Network Physical Plane Architecture.

Q. 1205, ITU–T Recommendation, Telecommunication Standardization Sector of ITU.

"General Recommendations On Telephone Switching And Signaling–intelligent Network/Distributed Functional Plane For Intelligent Network CS–1," ITU–T Recommendation Q. 1214, ITU—Telecommunication Standardization Sector.

"Revised Draft Of Q.2650 (DSS2/B–ISUP Interworking Recommendation)," Study Group 11, Geneva, ITU –Telcommunication Stadardization Sector, A Nov. 29 –Dec. 17, 1993.

ITU—Telecommunication Standardization Sector, Study Group 13, "Draft Revised Recommendation 1.580," Geneva, ITU—Telecommunication Standardization Sector, Study Group 13, Jul. 10–21, 1995.

"Final Draft Text For Broadband Capability Set 2 Signaling Requirements," Study Group 11 Attachment "D" Special Drafting Meeting, pp. 1–127, Torino, Italy, ITU–T Telecommunications Standardization Sector, Sep. 13–22, 1993.

"Report Of The Meeting Of SWP 13/1–4", Study Group 13, Temporary Document 46 (13/1), ITUT, Mar. 1994.

Beckman, Richard T. and Matthews, Joseph R., "Proposal For A Physical Architecture Based On The Harmonized Functional Architecture," Committee T1 Contribution T1S1.5/95–027, Bellcore,. Feb. 20, 1995.

Buhrke, Proposed Unified Functional Model, T1S1.5/ 95–036, Feb. 1995.

Faynberg, I., et al., "The Support Of Network Interworking And Distributed Context Switching In The In Service Data Funtion Model," pp. 11–16, 2nd Colloque International, ICIN 92, Mar. 1992.

Fukazawa, M., et al., "Intelligent Network Call Model For Broadband ISDN," pp. 30.6.1–30.6.5, Fujitsu Laboratories Ltd., Japan.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

"Network Signaling," Telephony, TCX12004, University of Excellence, pp. 5.8–5.17, Oct. 21 1991.

Kuribayashi, Shin–Ichi, "Advanced Signaling Protocol for Broadband ISDN Services" Electronics and Communications in Japan, Part 1, vol. 78, No. 1, 1995, pp. 1–12.

McKinney, Scott, "ATM for Narrowband Services" IEEE Communications Magazine, Apr. 1994, New York, US, pp. 64–72.

Palmer, Rob, "An Experimental ATM Network Featuring DeCoupled Modular Control,"Telecom Australia Research Laboratories (Victoria), pp. 118–122 (Nov. 1992).

Palmer, Rob, "An Experimental ATM Network for B–ISDN Research", IEEE Region 10 Conference, Melbourne, Australia, Nov. 1992.

"Annex E Of Recommendation Q.93B," Study Group 11, ITU –Telecommunication Standardization Sector, Nov. 29–Dec. 17, 1993.

Research, IEEE Region 10 Conference, Melbourne, Australia, Nov. 1992.

* cited by examiner

SYSTEM FOR MANAGING TELECOMMUNICATIONS

CROSS-REFERENCES TO RELATED APPLICATIONS

This application is a continuation of prior application Ser. No. 08/525,050, now U.S. Pat. No. 6,181,703 filed Sep. 8, 1995, which is incorporated by reference into this application, and which is a continuation-in-part of prior application Ser. No. 08/238,605, filed on May 5, 1994, now abandoned, which is incorporated by reference into this application and entitled "METHOD, SYSTEM AND APPARATUS FOR TELECOMMUNICATIONS CONTROL".

BACKGROUND OF THE INVENTION

1. Field of the Invention

The invention relates to telecommunications and specifically to a system that manages telecommunications by processing signaling to generate new signaling for the network elements that provide the telecommunications services.

2. Prior Art

Telecommunications networks use switches to process calls and set-up connections. The switches need to communicate with one another in order to accomplish this function. These communications between switches are known as signaling. A prominent example of signaling is Signaling System #7 (SS7). It is important to point out that signaling is different than the actual user traffic transported over the connections set-up by a call. Signaling is the communications which occur in order to set-up and tear down call connections.

A classic example of signaling is where a first switch processes a dialed number and selects a second switch to use on the call. The first switch extends the call connection to the second switch and signals the dialed number to the second switch. This second switch may repeat the process for a third switch, and the process would repeat until the call connection is complete. To facilitate this processing, the switch contains a central processing unit (CPU) and a signaling point. The switch CPU is coupled to the switch matrix and controls the connections established by the matrix. The switch CPU processes the information, such as a dialed number, to select a connection and direct its associated switch matrix to make the connection. The switch signaling point acts as the signaling interface for the switch CPU by transmitting and receiving signaling and converting call information between the signaling protocol and the switch CPU protocol.

Signaling has attained additional functionality with the evolution of what is called the intelligent network. In the intelligent network, switches are supported by external processors and databases. Switches process the signaling they receive to process calls. During this processing, the switch CPU may recognize that it needs the support of external processing or data. To obtain this support, the switch CPU and signaling point will generate a new signaling message to send to an external processor. The new signaling message is known as a query. The external processor will process the query and respond to the same switch with a signal containing additional information to support the switch.

A classic example of intelligent network operation is the 800 call (also known as free phone). For 800 calls, a switch will receive a call set-up message including the dialed number. In SS7, this is an initial address message (IAM). The switch would process the IAM until it recognized that the dialed number had an area code of 800, and that the switch would require support from an external database to obtain a standard telephone number it can use to route the call. This act of recognition is known as a trigger. The standard telephone number is known colloquially as a plain old telephone service (POTS) number. As such, the switch would generate a signaling message to send to an external database. In SS7, this is a transaction capabilities application part (TCAP) message and is commonly known as a query. The external processor that receives the TCAP query is known as a service control point (SCP). The SCP analyzes the query and typically responds to the switch with the appropriate POTS number. The switch can then process the call in a conventional fashion. Those skilled in the art are aware of the many special call processing features that can be implemented through an SCP.

Thus, it is known in the art that a switch initially receives a call set-up message to begin call processing. The switch may trigger during call processing and invoke an external processor with a separate query message. After analysis, the external processor will respond to that same switch with its own message.

At present, the switches are the devices which receive and process the call set-up signaling to route calls and invoke the intelligent network. As a result, current networks are limited to what the switch can accomplish in the form of call processing. In order to add new functionality, the switch CPU must be re-programmed with new call-processing logic or an existing switch trigger must be re-used. Both restrict a network's ability to provide new services. Since the switch remains the primary platform from which call processing is initiated and controlled, networks must wait until switches are developed with the requisite functionality before new services and interworking can be deployed.

A current example of this problem is provided by asynchronous transfer mode (ATM) switches. Although ATM switches are currently functional to transport broadband traffic, ATM switches which can handle extensive call capacity and signaling are not available. Support systems for these switches, such as billing and trigger detection, are not at a robust stage of development. As a result, networks have to wait until ATM switches develop additional capability before the broadband transport functionality can be fully exploited. Systems are needed which do not rely on the signal processing and call processing capabilities of the switches.

At least one system has suggested routing user service requests to a call server that is external to a switch. However, this system requires that the call processing be separated from connection processing. This separation requires the deployment of an entirely new and proprietary signaling system. In this system, a call server receives user signaling and selects services and route characteristics. A separate connection server selects the route, and a separate channel server selects the specific connections on the route. The servers communicate with a proprietary signaling protocol. This system is not yet defined to a point sufficient for implementation. As such, the system could not be as readily implemented as a system which integrates call processing with connection processing and uses conventional signaling protocols.

SUMMARY OF THE INVENTION

The invention includes a method of call processing where a user transfers a call set-up signaling message to a telecommunications network that comprises at least one network element connected to a communication path. A signaling processor is also linked to the network element and the user. The method comprises receiving the call set-up signaling message into the signaling processor. The signaling processor only communicates with the network element over a signaling link and is not coupled to a switch matrix. The signaling processor performs call processing in response to the call set-up signaling message to produce a new signaling message that directs the network element to provide a telecommunications service. The signaling processor transmits the new signaling message to the network element connected to the communication path. The signaling message received by the signaling processor could be a Signaling System #7 (SS7) initial address message (IAM).

The call processing could include validating the call, service identification, N00 call processing, personal/terminal mobility call processing, voice messaging call processing, virtual private network call processing, implementing echo control, generating billing information, selecting a virtual connection, and POTS call processing. The signaling messages could be conventional signaling. They could be from the same protocol or they could be from different signaling protocols, such as SS7 Integrated Services User Part (ISUP) signaling and SS7 Broadband Integrated Services User Part (B-ISUP) message.

The invention also includes a signaling processing system that comprises a signaling interface to transmit and receive signaling messages over a signaling link and a call/connection processor that is coupled to the signaling interface. The call connection/processor is not coupled to a switch matrix and is operable to perform call processing, produce a new signaling message based on the call processing, and to transmit the new signaling message through the signaling interface. The new signaling message directs a network element to provide a telecommunications service for the call. The network element is connected to a communications path for the call and did not generate the initial signaling message received through the signaling interface. The call/connection processor only communicates with the network element through the signaling interface.

Another embodiment of the invention is a method for selectively validating calls that comprises accepting a call and receiving the caller number and the called number. Before validating the call, determining if the call is a type of call that requires validation, and if the call does not require validation, then processing the called number, but if the call requires validation, then entering a validation database with the caller number before further processing of the called number.

The invention also includes a method for selectively validating calls that comprises accepting a call and receiving the caller number and the called number for the call. Then, determining if the called number is an "800" number, and if the called number is an "800" number, then entering an "800" number database with the called number before entering a validation database with the caller number; but if the called number is not an "800" number, then entering a validation database with the caller number before further processing of the called number.

The invention also includes a telecommunications system that provides telecommunications services to users of the system. The system comprises ATM switches, ATM multiplexers, ATM connections, narrowband connections, signaling links and signaling processors, The signaling processors reside externally to the ATM switches and receive and process a signaling message from a user for a call. The signaling processors generate and transmit a new signaling message that directs an ATM switch to provide a telecommunications service to the user for the call.

BRIEF DESCRIPTION OF THE DRAWINGS

The invention can be better understood by reference to the following drawing figures where:.

DETAILED DESCRIPTION OF THE INVENTION

The invention provides a system for managing telecommunications which is not as dependent on switch functionality as prior systems. This is accomplished by employing a system which processes call signaling and does not have to be bundled with a switch and associated switch matrix. Using the invention, the switches can be used to provide their switching and transport functions irrespective of their capability to provide other features. In addition, some embodiments of the invention can logically integrate call and connection processing, and can be operational with conventional signaling systems.

Figure 1:
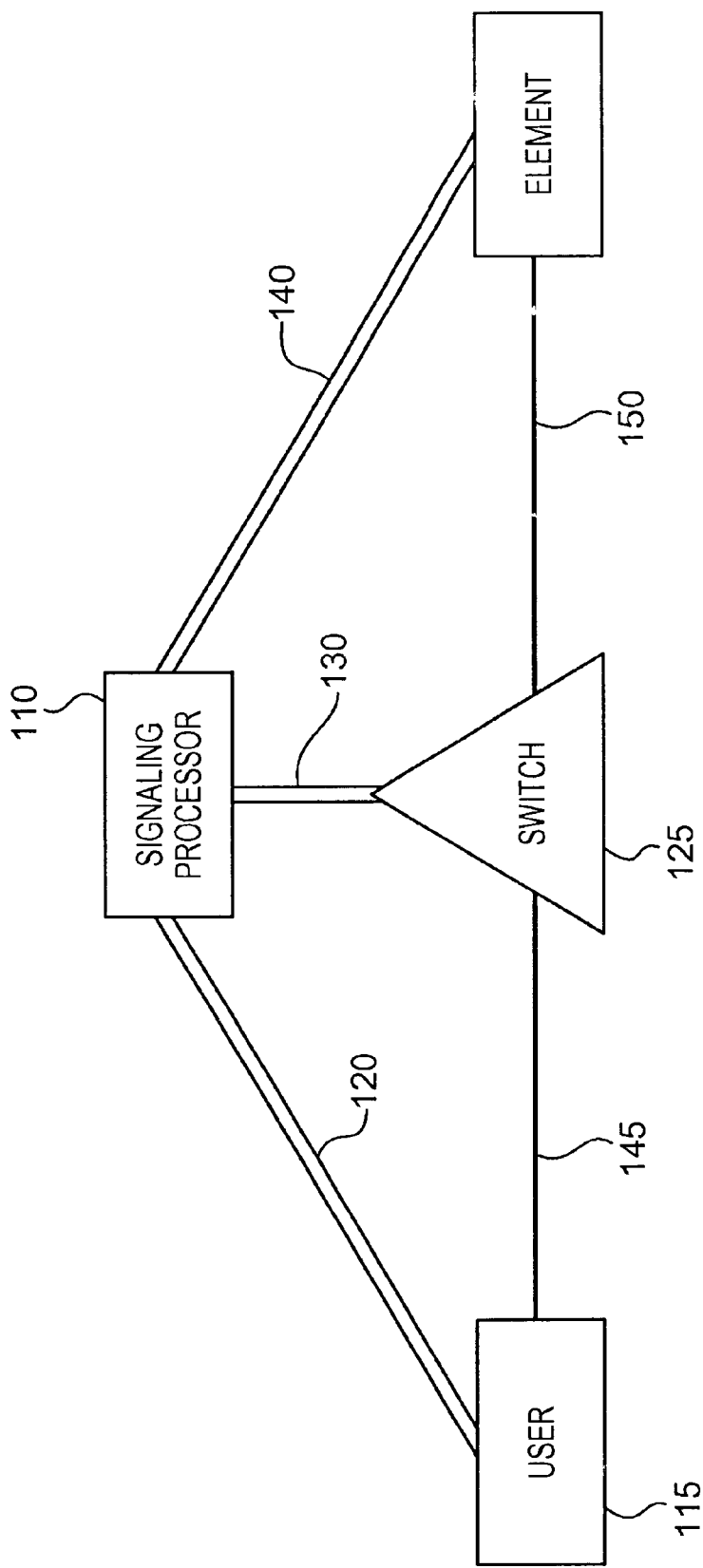
FIG. 1 depicts a block diagram of a version of the invention.

On the figures, connections that carry user information are shown as single lines and signaling links that carry signaling messages are shown as double lines. FIG. 1 depicts a basic version of the unique invention. Signaling processor 110 is shown connected to user 115 by link 120. Processor 110 is also connected to switch 125 by link 130 and to element 135 by link 140. User 115 is connected to switch 125 over connection 145. Switch 125 is connected to element 135 over connection 150. Aside from processor 110, these components are known in the art. User 115 could be any entity requesting a service that requires a communication path with a few examples being a telephone, a computer, or a local exchange carrier (LEC) switch. Switch 125 could be any device which establishes communications paths in response to signaling with examples being a Northern Telecom DMS-250 or a Fore Systems ATM Switch. Element 135 could be any device to which calls are connected. A few examples would be a switch, cross-connect, server, enhanced platform, or even, a destination telephone or computer. Connections 145 and 150 could be any media which carries user information with a few examples being DS3 trunks, SONET/ATM virtual connections, or wireless connections.

Links 120, 130, and 140 could be media which transfers telecommunications signaling with a few examples being a 56 kbit data line, a virtual channel carrying SS7, or a UDP/IP link. Those skilled in the art will readily appreciate that networks typically deploy numerous other switches, connections, links, and other network elements which are not shown on FIG. 1 for purposes of clarity. Among these other network elements might be SCPs, signal transfer points (STPs), multiplexers, and echo cancellers, but there are many others.

Processor 110 could be any processing platform configured to support the requirements of the invention and is discussed in detail below. In operation, user 115 would request a service that requires a communications path by signaling a network. These signals are directed to processor 110 over link 120. Those skilled in the art are aware that STPs might be used for this purpose. In addition, in-band signals, such as those on a local loop, may pass through a switch before they are separated out-of-band and directed to processor 110. Any technique for directing user signaling to processor 110 is contemplated by the invention. This signaling is known as call set-up signaling and for SS7, it is the IAM.

It is important to note that the call set-up signaling from user 115 is directed to processor 110 and is not processed by switch 125 in order to recognize a trigger or establish a communication path. Processor 110 does not merely receive queries generated by switch 125 that are generated in response to the call set-up signaling from user 115. It is also important to note that processor 110 does not accept connections 145 or 150 which carry the actual user traffic. As such, processor 110 is linked to the switch only by a signaling link. It is not coupled to a switch matrix and can be external to the switch. However, the signaling processor could actually reside physically within a switch if it is not coupled to the switch matrix and only communicates with the switch over a signaling link. Those skilled in the art are aware of how a switch CPU is coupled to the switch matrix.

Processor 110 would process the call-set up signaling. For a typical call, this might include verifying the dialed number, validating the caller, controlling an echo canceller, generating billing information, selecting connections for the call, and generating signaling incorporating the pertinent information to complete the call. This signaling generated by processor 110 would be transmitted over link 130 to switch 125 in order to provide the service. This may include setting up the communications path over connections 145 and 150. If required, processor 110 could also generate and transmit appropriate signaling to element 135 over link 140 or to user 115 over link 120. The signaling could be conventional signaling such as SS7.

Figure 2:
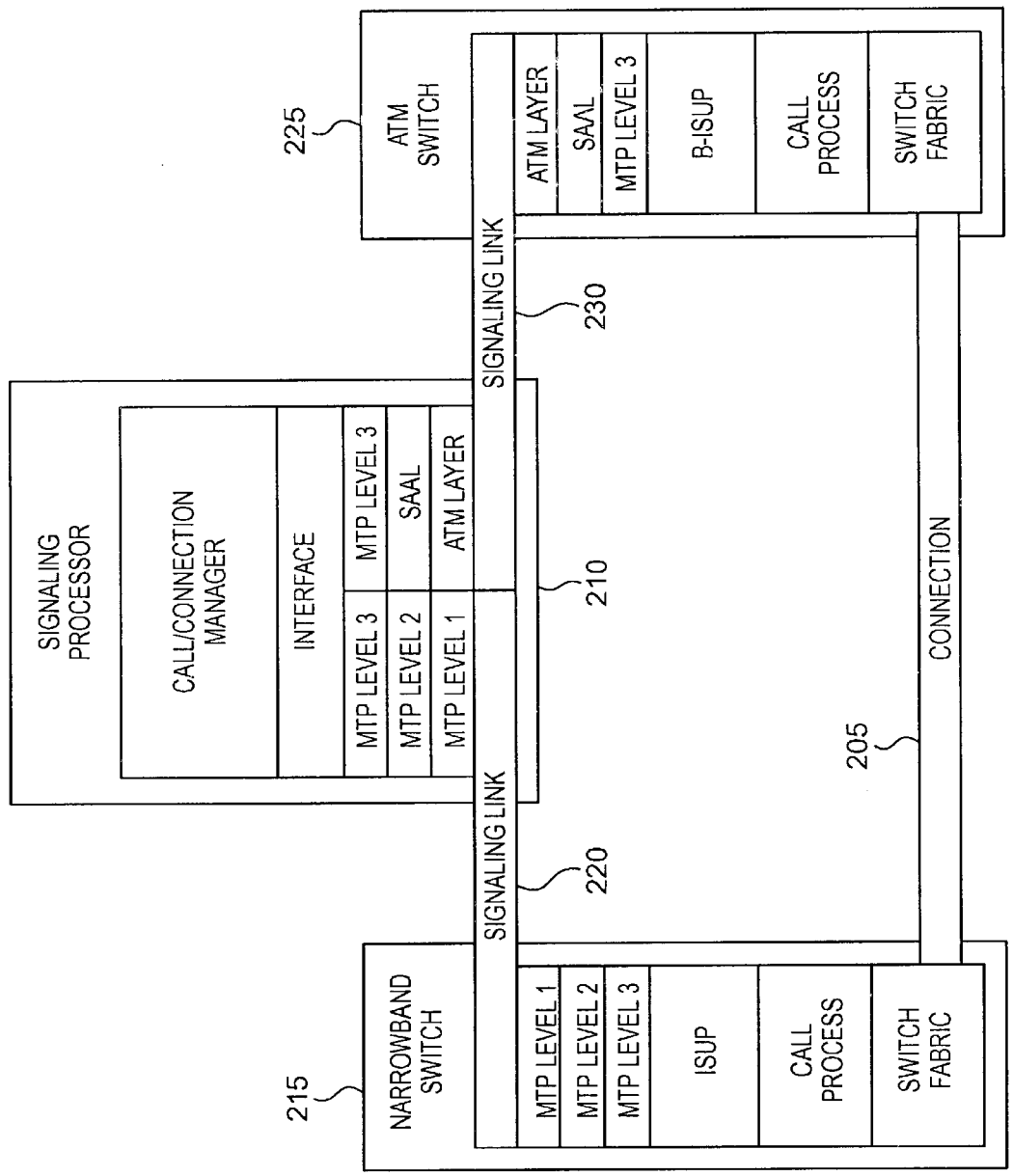
FIG. 2 depicts a logic diagram of a version of the invention.
Figure 3:
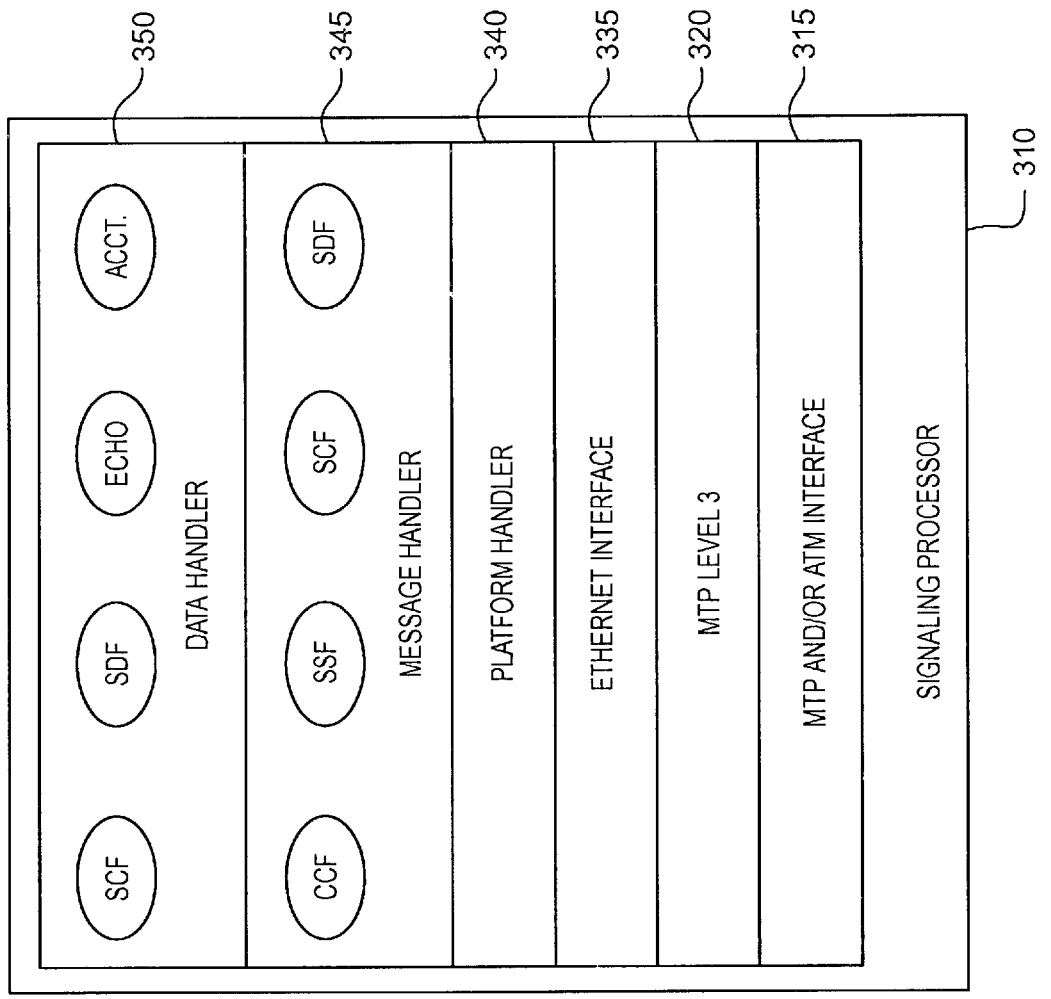
FIG. 3 depicts a logic diagram of a version of the invention.

FIG. 2 depicts another embodiment of the invention, although the invention is not restricted to this embodiment. Narrowband switch 215 is shown connected to ATM switch 225 by connection 205. Signaling processor 210 is shown linked to narrowband switch 215 by signaling link 220. Signaling processor 210 is also shown linked to ATM switch 225 by signaling link 230.

Those skilled in the art are familiar with the logical breakdown and functionality shown for switches 215 and 225. Both switches 215 and 225 contain switching fabric that is connected by connection 205. The switch fabric and connection 205 carry the user information for a call. Both the switch fabric and connection 205 are well known. An interworking multiplexer would be used to convert the traffic on connection 205 between narrowband and broadband formats. The multiplexer is not shown for purposes of clarity.

Signaling is required to control the switching function. Signaling link 220 is connected to message transfer part (MTP) level 1. The signaling link is typically an SS7 link. MTP level 1 defines the physical and electrical requirements for link 220. MTP level 2 sits on top of level 1 and maintains reliable transport over link 220 by monitoring status and performing error checks. Together, MTP levels 1–2 provide reliable transport over an individual link. A device would need MTP level 1–2 functionality for each link it uses. MTP level 3 sits on top of level 2 and provides a routing and management function for the signaling system at large. MTP level 3 directs messages to the proper signaling link (actually to the MTP level 2 for that link). MTP level 3 directs messages to applications using the MTP levels for access the signaling system. MTP level 3 also has a management function which monitors the status of the signaling system and can take appropriate measures to restore service through the system. MTP levels 1–3 correspond to layers 1–3 of the open systems interconnection basic reference model (OSIBRF). Both the MTP 1–3 and the OSIBRF are well known in the art Switch 215 has integrated services digital network user part (ISUP) logic which supports basic call processing. ISUP uses MTP to transmit messages across the signaling system. The information contained in ISUP messages is used by telecommunications networks to implement services and establish communications paths. A few examples of ISUP information are the dialed number and the caller's number. ISUP employs many different message types to carry this information with a few examples being the initial address message (IAM) and the answer message (ANM). ISUP is well known in the art.

Narrowband switch 215 has call process logic which processes the call information provided by ISUP in order to control the switch fabric and establish communication paths. A classic example of this would be the analysis of a dialed number to select a route for the call. Narrowband switch call processors are well known in the art.

ATM switch 225 has ATM layer, signaling ATM adaption layer (SAAL), and MTP level 3 logic which provide routing, management, and transport over the signaling system. Signaling link 230, typically an ATM virtual connection transported by SONET or DS3 facilities, is connected to the ATM layer. The ATM layer is analogous to MTP level 1 and transmits and receives ATM cells containing signaling messages on the link specified in the cell header. The SAAL assembles and disassembles these cells, maintains individual virtual connections, performs error checks and is analogous to MTP level 2. The MTP level 3 logic in ATM switch 225 performs the same basic functions as described above for MTP level 3, but the broadband version of MTP level 3 has been updated to support the needs of broadband systems. The ATM layer, the SAAL, and the updated MTP level 3 are known in the art.

ATM Switch 225 has broadband-ISUP (B-ISUP) logic which supports basic call processing in the broadband environment to control the broadband switch fabric. B-ISUP uses MTP level 3, the SAAL, and the ATM layer to transmit messages across the signaling system. The information contained in B-ISUP generated messages is used by telecommunications networks to establish communications paths. A few examples of B-ISUP information are the dialed number and the caller's number. B-ISUP employs many different message types to carry this information with a few examples being the initial address message (IAM) and the answer message (ANM). B-ISUP is known in the art.

ATM switch 225 has call process logic which processes the call information provided by B-ISUP in order to control the switching fabric and establish communication paths. An example of this would be the assignment of a virtual connection to a call based on a dialed number. ATM switch call processors are known in the art.

Processor 210 is connected to signaling links 220 and 230. Processor 210 has the MTP and ATM logic described above which allow it to interface with components using either ISUP or B-ISUP. If ISUP or B-ISUP signaling is not required, the associated functions could be omitted.

Processor 210 has interface logic which transfers signaling between MTP level 3 and the call/connection manager (CCM). Processor 210 has CCM logic which is able to process the information in the signaling received from the interface. For a typical call, this might include verifying the dialed number, validating the caller, controlling an echo canceller, generating billing information, translating the dialed number, selecting a route for the call, and generating signaling to complete the call. The signaling generated by the CCM would be transported back through the interface for transfer to switches 215 or 225.

In one embodiment, narrowband switch 215 might be a LEC switch and ATM switch 225 might be an interexchange carrier (IXC) switch. The IXC faces several problems when trying to interwork existing LEC narrowband switches with its own ATM switches. Current ATM switches do not support many of the features required by an IXC in a robust manner, such as routing and billing. Additionally, switches 215 and 225 are not equipped to exchange signaling without modifying one of the switches with a ISUP to B-ISUP signaling interworking unit. The present invention provides the interworking function between the two switches and provides call processing. This means a much less sophisticated ATM switch can be used.

In this embodiment LEC switch 215 might request a connection through the IXC. As a result, LEC switch 215 would signal the IXC with an SS7 IAM over signaling link 220. Processor 210 would accept the message through its MTP layers and interface. The interface would deliver the signal to the CCM, and the CCM would process the signaling information in the IAM. This may include verifying that the dialed number is legitimate, validating the caller by checking the Automatic Number Identification (ANI), generating a billing record, and controlling an echo canceller. The CCM could also process the dialed number to select a connection for the call. The pertinent portions of this information would be packed into an appropriate B-ISUP message and passed to the interface for subsequent transfer by the MTP 3, the SAAL, and the ATM layer to ATM switch 225 over signaling link 230. Based on the B-ISUP message, ATM switch 225 would connect the call. This would entail extending the communications path beyond connection 205 based on the signaling message from the CCM. As such, a communications path would be set-up through switch 215 and switch 225.

The Call/Connection Manager (CCM)

FIGS. 3–9 depict an embodiment of the signaling processor which is also referred to the a call/connection manager. Although this embodiment is preferred, the invention should not be restricted to this specific embodiment.

Signaling processor 310 is shown. Reference numeral 315 indicates that signaling processor 310 can be equipped with an MTP level 1–2 signaling interface, an ATM layer/SAAL signaling interface, or both. Signaling processor 310 would be equipped with MTP level 3 320 which operates as described above for ISUP and B-ISUP. Also shown for signaling processor 310 is ethernet interface 335. Ethernet interface 335 is a standard ethernet bus supporting TCP/IP which transfers signaling messages from MTP level 3 to platform handler 340. Together, the above components provide a signaling interface for the signaling processor. Those skilled in the art will recognize other interfaces and protocols which could provide a signaling interface in accord with the invention.

The signaling interface would be operational to route select ISUP messages to platform handler 340. One technique for accomplishing this would be to make signaling processor 310 a user part of the STP. A point code converter could be placed between MTP level 2 and MTP level 3 of the STP. The point code converter would convert the destination point code of messages that meet certain criteria to a point code that identifies signaling processor 310. The criteria could be loaded into a table and could include the originating point code (OPC), the destination point code (DPC), the (circuit identification code), and various combinations of these criteria. The conversion at this location in the STP could be specific to the signaling link used by the message, so the conversion tables could inherently account for the link used by the message. After conversion, the distribution function of MTP level 3 would forward signaling messages with the converted DPC to platform handler 340 over ethernet interface 335. A similar conversion function could be placed prior to the route function of MTP level 3 to convert point codes for messages transmitted by platform handler 340 out through the STP. The above technique is disclosed in United States patent application entitled, "TELECOMMUNICATIONS APPARATUS, SYSTEM, AND METHOD WITH AN ENHANCED SIGNAL TRANSFER POINT", filed simultaneously with this application, assigned to the same assignee, and which is incorporated by reference into this application.

Alternatively, an SS7 signaling interface to the platform handler could be constructed using commercially available SS7 software tools. An example of such tools would be SS7 interface software provided by Trillium, Inc. Signaling messages with a destination point code (DPC) matching the point code for signaling processor 310 would be routed to the signaling interface of signaling processor 310 by the STP. Additionally, the STP could convert the DPC of a signaling message to the point code of signaling processor 310 as described above. However, since signaling processor 310 is not a user part of the STP, the route function of MTP level 3 in the STP would route the signaling message to signaling processor 310 over a signaling link. The signaling interface would receive the signaling message and transfer it to platform handler 340.

Although point code conversion facilitates a transition from existing systems to one of the present invention, it is not essential. Any method of forwarding signaling the CCM is sufficient.

Also shown are platform handler 340, message handler 345, and data handler 350. Platform handler 340 is a system which accepts ISUP and B-ISUP messages from ethernet interface 335 and routes them to message handler 345. Preferably, platform handler 340 is configured to route messages to a particular message handler processor based on the signaling link selection (SLS) code in the message. Message handler 345 is a system which exchanges signaling with platform handler 340 and controls the connection and switching requirements for the calls. It can select and implement services and initiate echo control. It also converts signaling between ISUP and B-ISUP. Data handler 350 is a set of logic coupled to message handler 345 which processes service requests and provides data to message handler 345. Data handler 350 also controls echo cancellers and generates billing records for the call.

In the discussions that follow, the term ISUP will include B-ISUP as well. In operation, ISUP messages that meet the proper criteria are routed by MTP and/or ATM interface 315, MTP level 3 320, and ethernet interface 335 to platform handler 340. Platform handler 340 would route the ISUP messages to message handler 345. Message handler 345 would process the ISUP information. This might include validation, screening, and determining if additional data is needed for call processing. If so, data handler 350 would be invoked and would provide message handler 345 with the relevant data so message handler 345 could complete call processing. Message handler 345 would generate the appropriate ISUP message to implement the call and pass the signals to platform handler 340 for subsequent transmission to the designated network elements.

The distribution of functional entities among message handler 345 and data handler 350 are shown. These functional entities are well known in the art. Message handler 345 includes at least the call control function (CCF) and the service switching function (SSF). The CCF establishes and releases call connections, and the SSF recognizes triggers during call processing by the CCF and provides an interface between the CCF and the service control function (SCF). The SCF identifies services and obtains data for the service. In some embodiments, message handler 345 can include the SCF and the service data function (SDF). The SDF provides service data in real time to the SCF. Taken together, message handler 345 is able to at least control connections and recognize triggers. In some embodiments, message handler 345 can also identify services, obtain data for the services, and generate the signaling required to implement the services. Message handler 345 can provide signaling interworking (i.e. ISUP to B-ISUP), connection control, service selection and service implementation in a logically integrated package that interfaces with the network through conventional means.

Data handler 350 includes at least the SCF and the SDF. In some embodiments, message handler 345 and data handler 350 both include the SCF and the SDF and services are partitioned among the functional entities. Two other functions are shown in data handler that are not standardized functional entities. Accounting generates a billing record and echo handles the echo cancellers. Typically, an echo canceller is disabled for a data call and enabled after the data call for use on subsequent voice calls, however, other techniques are applicable.

In operation, the CCF would perform basic call processing until the SSF recognized a trigger and invoked the SCF. The SCF would identify the service associated with the trigger. The SCF would access data from the SDF in order to implement the service. The SCF would process the data from the SDF and provide the data to the CCF through the SSF. The CCF would then set-up the connections through conventional signaling to service switching points (SSPs). The SSPs are connected to the communications path and make the connections. Typically, an SSP is a switch. Also, echo cancellers may be controlled for the call, and a billing record could be generated for the call.

Those skilled in the art are aware of various hardware components which can support the requirements of the invention. For example, the platform handler, message handler, and data handler could each reside on a separate SPARC station 20.

The Platform Handler

Figure 4:
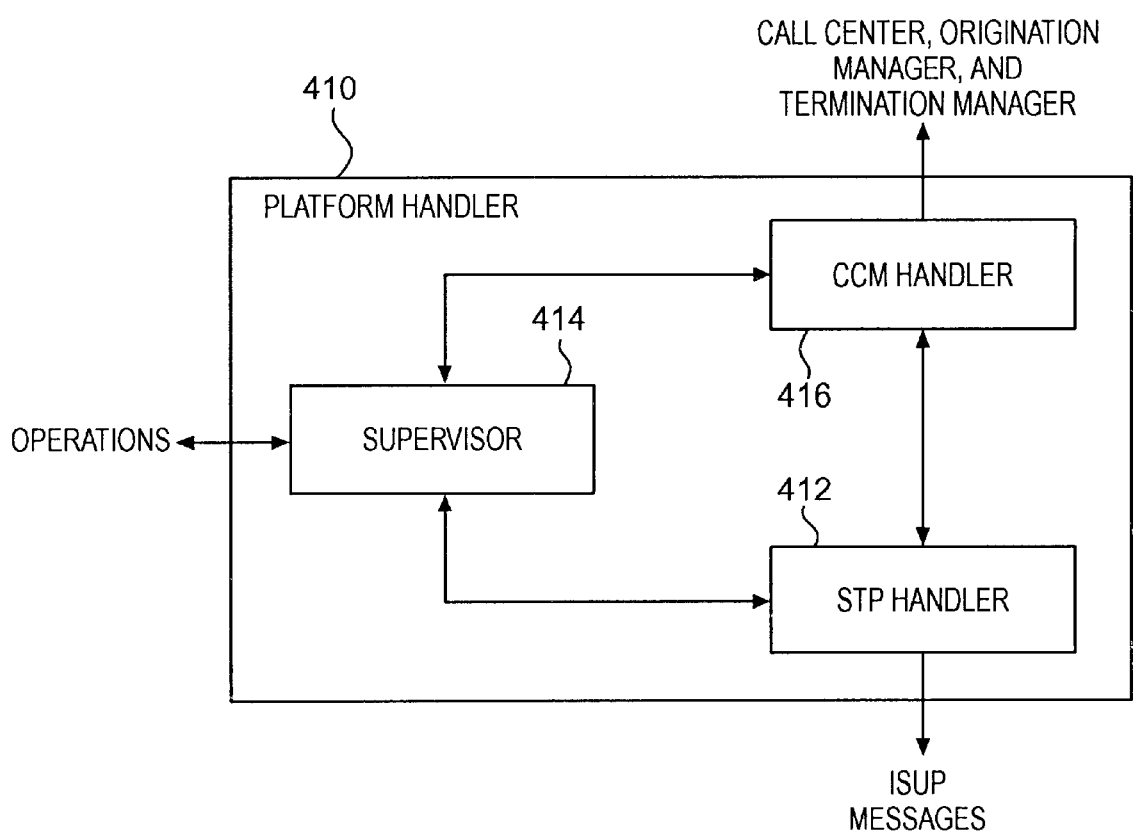
FIG. 4 depicts a logic diagram of a version of the invention.

FIG. 4 shows a possible version of the platform handler. Platform handler 410 is shown. Platform handler 410 includes STP handler 412, supervisor 414, and CCM handler 416.

Platform handler 410 transmits and receives ISUP messages to/from a signaling interface. That STP routed ISUP messages with particular characteristics to an application residing on top of the STP. The application could be the CCM and the characteristics could be the originating point code (OPC), destination point code (DPC), signaling link selection (SLS), circuit identification code (CIC), and/or the service information octet (SIO). The connection between platform handler 410 and the STP could be an ethernet LAN transporting ISUP messages encapsulated in TCP/IP packets. STP handler 412 would provide the ethernet—TCP/IP interface. STP handler 412 has a process to buffer and dis-assemble the incoming packets to the CCM, and buffer and assemble outgoing packets. STP handler 412 could also check the messages for basic flaws. Any technique for transfer of signaling messages to platform handler 410 is contemplated by the invention.

Supervisor 414 is responsible for managing and monitoring CCM activities. Among these are CCM start-up and shut-down, log-in and log-off of various CCM modules, handling administrative messages (i.e. error, warning, status, etc.) from the CCM modules, and handling messages from network operations such as queries, configuration instructions, and data updates. The connection to network operations is the man machine interface which allows the CCM to be controlled and monitored by either a remote or a local operator. Supervisor 414 has a process which retrieves configuration data from internal tables to initialize and configure the CCM. The CCM modules also have internal tables which are used in conjunction with this procedure. Supervisor 414 also communicates internally with STP handler 412 and CCM handler 416.

CCM handler 416 exchanges ISUP information with STP handler 412. CCM handler 416 also exchanges ISUP messages and CCM supervisory messages with the message handler. The connection between CCM handler 416 and the message handler could be an ethernet LAN transporting these messages encapsulated in TCP/IP packets, but other methods are known. CCM handler 416 would provide the ethernet—TCP/IP interface. CCM handler 416 has a process to buffer and dis-assemble the incoming packets from the message handler, and buffer and assemble outgoing packets to the message handler. CCM handler 416 could also check the messages for basic flaws.

Internally, platform handler 410 is equipped with bi-directional channels which exchange information among STP handler 412, supervisor 414, and CCM handler 416. The channels between STP handler 412, CCM handler 415, and supervisor 412 carry supervisory and administrative information. The channel between STP handler 412 and CCM handler 416 carries ISUP message information.

Platform handler 410 accepts, disassembles, and buffers ISUP messages received from the network. It can perform basic checks on the messages before transferring them to the message handler. Should more than one message handler be connected to platform handler 410, the ISUP messages could be allocated to the message handlers based on the SLS of the particular ISUP message. CCM handler 416 accepts routing instructions from the message handler for routing certain ISUP messages to select processes of the message handler. Platform handler 410 also provides supervision and a man/machine interface for the CCM.

The Message Handler

Figure 5:
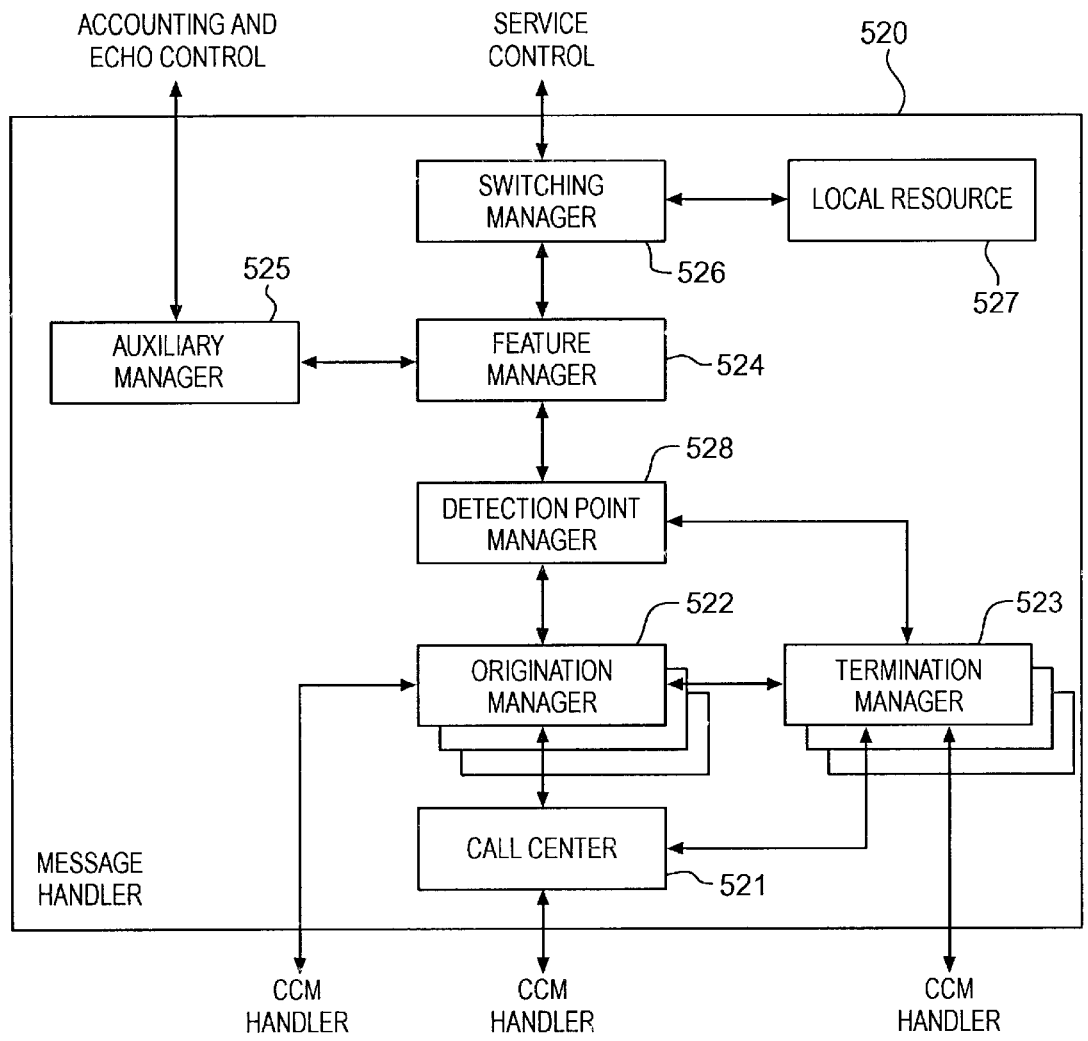
FIG. 5 depicts a logic diagram of a version of the invention.

FIG. 5 depicts a possible version of the message handler. Message handler 520 is shown and includes call center 521, origination manager 522, termination manager 523, detection point manager 528, feature manager 524, auxiliary manager 525, switching manager 526, and local resource 527. A primary function of message handler 520 is to modify ISUP messages.

Call center 521 is the process which receives call set-up messages from the platform handler. ISUP call set-up is initiated with the IAM. When call center 521 receives an IAM, it creates an instance of an origination manager process with data defined by the information in the IAM. Origination manager 522 represents any of the origination manager processes spawned by call center 521. The CCM handler is instructed of the new instance so that subsequent ISUP messages related to that call can be transferred directly to the appropriate instance of origination manager 522 by the platform handler.

Origination manager 522 sets up a memory block called an originating call control block. The call control block provides a repository for information specific to a call. For example, the originating call control block could identify the following: the call control block, the origination manager, the message handler, the originating LEC, the LEC trunk circuit (CIC), the ATM virtual circuit, the ATM virtual path, the caller's number, the dialed number, the translated dialed number, the originating line information, the ANI service class, the selected route, the number of the selected route, the SLS, the OPC, the DPC, the service indicator (SIO), echo cancellation status, reason of release, call status, and pointers to adjacent call control blocks. In addition, the call control block would also contain the various times that signaling messages are received, such as the address complete message (ACM), the answer message (ANM), the suspend message (SUS), the resume message (RES), and the release message (REL). Those skilled in the art would be aware of other pertinent data to include.

Origination manager 522 executes call processing in accordance with the Basic Call State Model (BCSM) recommended by the International Telecommunications Union (ITU), but with some notable exceptions. Origination manager 522 processes the IAM through each point in call (PIC) until a detection point (DP) is encountered. When a detection point is encountered, a message is sent to detection point manager 528 and processing is suspended at origination manager 522 until detection point manager 528 responds. An example of a detection point for origination manager 522 would be to authorize an origination attempt.

Detection point manager 528 accepts messages from originating manager 522 caused by a detection point encountered during call processing. Detection point manager 528 will identify whether or not the detection point is armed. An armed detection point has specific criteria which can affect call processing if met. If the detection point is not armed, detection point manager 528 will send a continue signal back to origination manager 522. A continue message instructs origination manager 522 to continue call processing to the next detection point. If the detection point is armed, detection point manager 528 will take action to see if the detection point criteria are met. If detection point manager 528 requires assistance to process the armed detection point, it will send a message to feature manager 524.

Feature manager 524 would accept messages from detection point manager 528 and either forward the a message to auxiliary manager 525 or to switching manager 526. Particular feature messages would be routed to auxiliary manager 525 which will process these call features. These are typically non-IN features, such as echo control or POTS billing. Other feature messages would be routed to switching manager 526. These are typically IN features. Examples of IN features are 800 number translation or a terminal mobility number translation. Feature manager 524 will pass information back to detection point manager 528 (then to origination manager 522) when it is received back from auxiliary manager 525 or switching manager 526.

Switching manager 526 which will determine if the request will be handled by local resource 527 or by the data handler. Local resource 527 will be structured to provide data more efficiently stored at message handler 520. Examples of such data include: an automatic number identification (ANI) validation table which checks the caller's number, a dialed number translation table to translate POTS numbers into a routing instructions, or N00 translation tables to translate select 800 numbers into routing instructions. Examples of a routing instruction yielded by the tables would be a switch/trunk or a virtual connection. An example of data in the data handler would be virtual private network (VPN) routing tables or complex 800 routing plans.

Typically, originating manager 522 will execute through the pertinent points in call to a point indicating that set up is authorized. At this point, origination manager 522 will instruct call center 521 to create an instance of a termination manager. Termination manager 523 represents any of these termination managers. Origination manager 522 will also transfer IAM information to termination manager 523. Termination manager 523 sets up a memory block called a terminating call control block. The call control block provides a repository for information specific to a call and is similar in composition to the originating call control block.

Termination manager 523 also operates in accord with the BCSM of the ITU, but also with some exceptions. Termination manager 523 continues processing for the call through its own points in call until detection points are encountered. When a detection point is encountered, a message is sent to detection point manager 528 and processing is suspended at termination manager 523 until detection point manager 528 responds. An example of detection point for termination manager 522 would be to authorize termination which would entail authorizing the call as set-up by origination manager 522. Messages from termination manager 523 to detection point manager 528 are handled as discussed above for messages from originating manager 522. When processing by termination manager 523 is complete, it will produce an IAM to transmit through platform handler 410 to the appropriate network elements.

Message handler 520 communicates with the data handler using a data transfer protocol. Examples include UDP/IP, or the Intelligent Network Applications Protocol (INAP) which is contained within the component sublayer of Transaction Capabilities Application Part (TCAP).

The Data Handler

Figure 6:
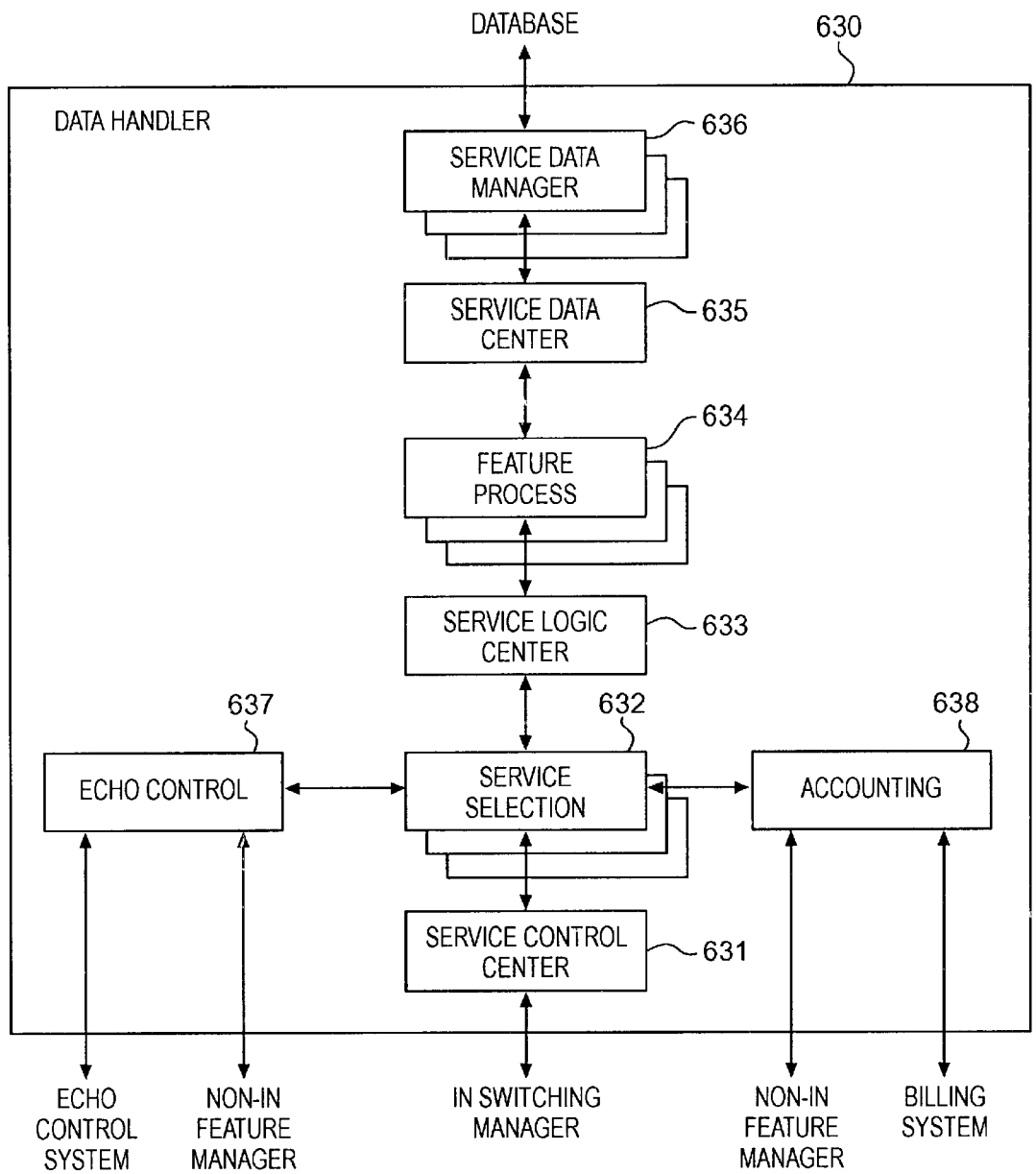
FIG. 6 depicts a logic diagram of a version of the invention.

FIG. 6 shows a possible version of the data handler. Data handler 630 is shown. Data handler 630 includes service control center 631, service selection 632, service logic center 633, feature process 634, service data center 635, service data manager 636, echo control 637, and accounting 638. Data handler 630 receives service request messages from the message handler. These messages result from an armed detection points triggering the message handler to invoke data handler 630. The messages also result from features implemented through the auxiliary manager. Service control center 631, service logic center 633, and service data center 635 are static processes created at start-up. Service control center 631 creates instances of service selection managers on a call by call basis. Service control center 631 notifies the Switching manager to route subsequent service request messages for that call to the appropriate service selection manager. Service selection manager 632 represents any of the service selection managers created by service control center 631.

Service selection manager 632 executes the service portion of the call processing. Service selection manager 632 identifies the various services associated with each message and implements the service through messages to service logic center 633. Service logic center 633 accepts messages from service selection 632 and creates instances of the feature processes required for the identified services. Examples of feature processes are N00, messaging, personal/terminal mobility, and virtual private network (VPN). Feature processes are service logic programs which implement the required services for a call. Feature process 634 represents any of the feature processes created by service logic center 633. Feature process 634 accesses the network resources and data required to implement the service. This would entail executing service independent blocks (SIBs). A SIB is a set of functions. An example of a function would be to retrieve the called number from a signaling message. SIBs are combined to build a service. An example of a SIB is translating a called number.

Those skilled in the are familiar with the above services, although they have never been implemented by a system such as the present invention. N00 services are services such as 800, 900, or 500 calling in which the dialed number is used to access call processing and billing logic defined by the subscriber to the service. Messaging entails connecting the caller to a voice messaging service. For example, the receipt of a release message (REL) with a cause of busy could be a trigger recognized by the message handler. In response, the data handler would create an instance of the messaging feature process and determined if a call placed to a particular dialed number would require the voice messaging platform. If so, the CCM would instruct an SSP to connect the caller to the voice message platform. Personal/Terminal mobility includes recognizing that the dialed number has mobility that requires a database look-up to determine the current number. The database is updated when the called party changes locations. VPN is a private dialing plan. It is used for calls from particular dedicated lines, from particular calling numbers (ANIs), or to particular dialed numbers. Calls are routed as defined for the particular plan.

In the execution of the SIB to provide the service, feature process 634 would invoke service data center 635 to create an instance of service data manager 636. Service data manager 636 accesses the network databases that provide the data required for the service. Access could be facilitated by TCAP messaging to an SCP. Service data manager 636 represents any of the service managers created by service data center 635. Once the data is retrieved, it is transferred back down to feature process 634 for further service implementation. When the feature processes for a call finish execution, service information is passed back down to the message handler and ultimately to the origination or termination manager for the call.

After a release message on a call, billing requests will be forwarded to accounting 638. Accounting 638 will use the call control block to create a billing record. The call control block would contain information from the ISUP messages for the call and from CCM processing. From the address complete message (ACM), the call control block would include the routing label, CIC, message type, and cause indicators. From the answer message (ANM), the call control block would include the routing label, CIC, message type, and backward call indicators. From the initial address message (IAM), the call control block would include the routing label, CIC, message type, forward call indicators, user service information, called party number, calling party number, carrier identification, carrier selection information, charge number, generic address, origination line information, original called number, and redirecting number. From the release message (REL), the call control block would include the routing label, CIC, message type, and cause indicators. From the suspend message (SUS) or the pass along message (PAM), the call control block would include the routing label, CIC, and message type. Those skilled in the art are familiar with other pertinent information for a billing record and appreciate that some of this information could be deleted.

For POTS calls, the billing request will come from the origination and termination managers through the auxiliary manager. For IN calls, the request will come from service selection 632. Accounting 638 will generate a billing record from the call control blocks. The billing record will be forwarded to a billing system over a billing interface. An example of such an interface is the I.E.E.E. 802.3 FTAM protocol.

At some point during call set-up, the origination manager, termination manager or even the detection point process will check the user service information data and originating line information to assess the need for echo control. If the call is a data call, a message is sent to data handler 630. Specifically, the message is routed through the auxiliary manager to the echo control manager 637 in data handler 630. Based on the CIC, echo control manager 637 can select which echo canceller and DS0 circuit needs to be disabled. A message will be generated to that effect and transmitted over a standard data link to the pertinent echo canceller or echo control system. Once a release (REL) message is received for the circuit, the echo canceller is re-enabled. On a typical call, this procedure will occur twice. Once for an echo canceller on the access side, and again for an echo canceller on the terminating side. The CCM that handles the IAM for a particular call segment will control the particular echo cancellers for the segment.

IAM Call Processing

Prior to a description of IAM processing, a brief description of SS7 message is given. SS7 messaging is well known in the art. SS7 ISUP messages contain numerous fields of information. Each message will have a routing label containing a destination point code (DPC), an origination point code (OPC), and a signaling link selection (SLS) which are used primarily for routing the message. Each message contains a circuit identification code (CIC) which identifies the circuit to which the message relates. Each message contains the message type which is used to recognize the message. ISUP messages also contain mandatory parts filled with fixed length data and variable length data, in addition to a part available for optional data. These parts vary from message type to message type depending on the information needed.

The initial address message (IAM) initiates the call and contains call set-up information, such as the dialed number. IAMs are transferred in the calling direction to set up the call. During this process, TCAP messages may be sent to access remote data and processing. When the IAMs have reached the final network element, an address complete message (ACM) is sent in the backward direction to indicate that the required information is available and the called party can be alerted. If the called party answers, an answer message (ANM) is sent in the backward direction indicating that the call/connection will be used. If the calling party hangs up, a release message (REL) is sent to indicate the connection is not being used and can be torn down. If the called party hangs up, a suspend message (SUS) is sent and if the called party reconnects, a resume (RES) message keeps the line open, but if their is no re-connection, a release message (REL) is sent. When the connections are free, release complete messages (RLC) are sent to indicate that the connection can be re-used for another call. Those skilled in the art are aware of other ISUP messages, however, these are the primary ones to be considered. As can be seen, the IAM is the message that sets-up the call.

Figure 7:
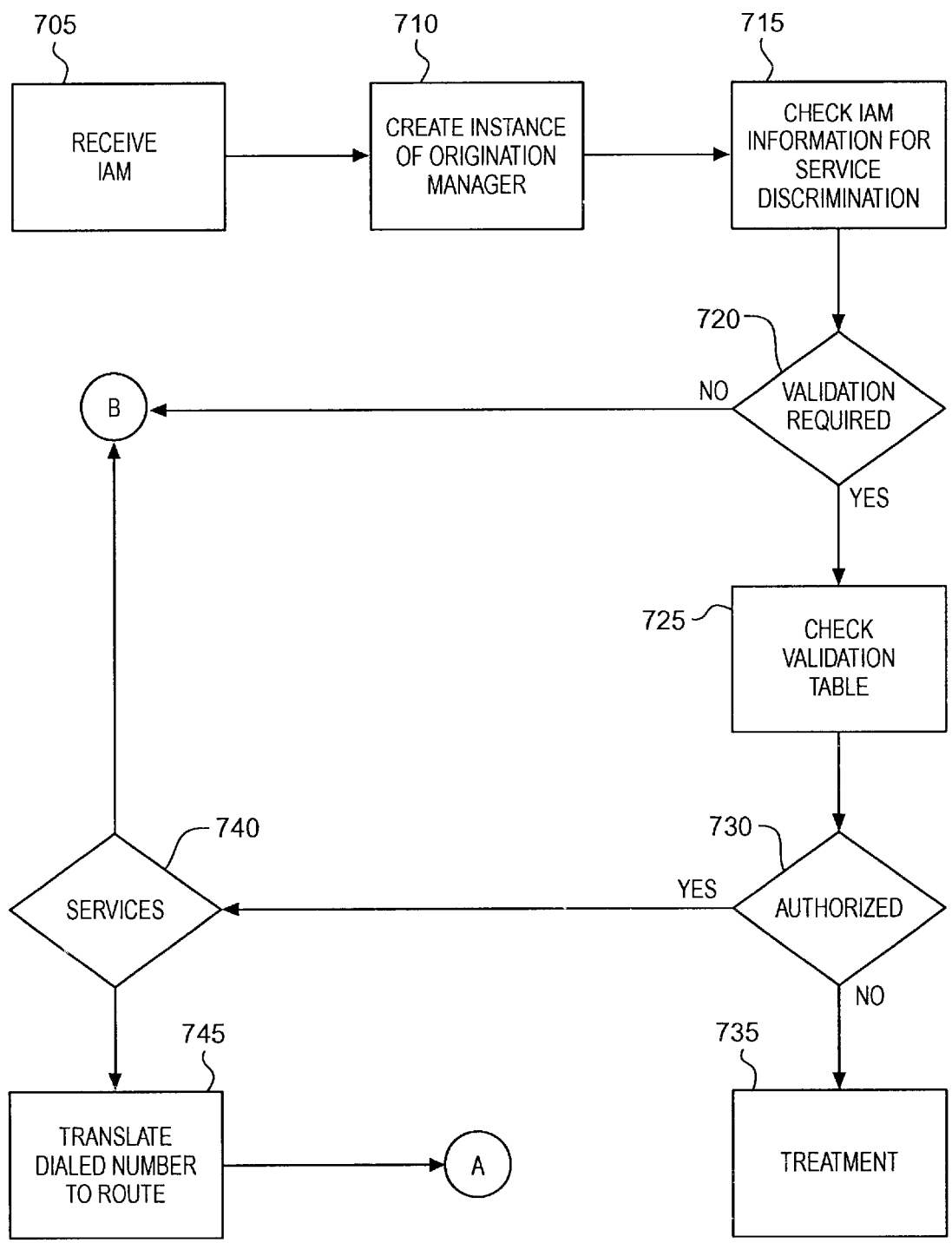
FIG. 7 depicts a flow diagram of a version of the invention.

In the preferred embodiment, call processing deviates from the basic call model recommended by the ITU, although strict adherence to the model could be achieved in other embodiments. FIGS. 7–10 depicts the preferred call processing. Referring first to FIG. 7, When the IAM for a call is received at 705, the call center creates an instance of an origination manager at 710.

The origination manager begins call processing by sending an authorize message to the detection point manager. Detection point manager checks IAM information, including the dialed number, the CIC, and the originating line information, to perform service discrimination at 715. This is done to determine if the service requested requires validation at 720. Current call processing systems and the BCSM of the ITU both validate the call before performing service discrimination. In a significant advance over the prior art, the preferred embodiment deviates from known call processing methods by looking at the IAM information prior to validation to determine if validation is even required. For example, the calling party may not pay the bill for a call. The called party pays the bill on 800 calls and validation can be unnecessary. If validation is not required at 720, call processing proceeds directly to B. Advantageously, this avoids unnecessary look-ups in validation tables for a significant percentage of calls.

If validation is required at 720, a validation table is checked at 725. Validation checks to see if a call should be allowed and focuses on potential billing problems for the call. For example, calls from ANIs that are delinquent on payments pose problems for billing and may not be validated. Validation would entail messaging from the detection point manager through the feature manager and the switching manager to the local resource to access the tables. The table may list authorized ANIs, unauthorized ANIs, or both. If the call is not authorized at 730, treatment (i.e. route to an operator or message) is given to the call at 735.

If the call is authorized at 730, the services identified at 715 are checked at 740 to determine if the call can be routed. This would typically occur for POTS calls. If no additional services are required at 740, the dialed number is translated into a route instruction at 745. The route instruction could be a particular virtual connection in the network. The processing then proceeds to A. If additional services are required at 740, processing proceeds to B.

Figure 8:
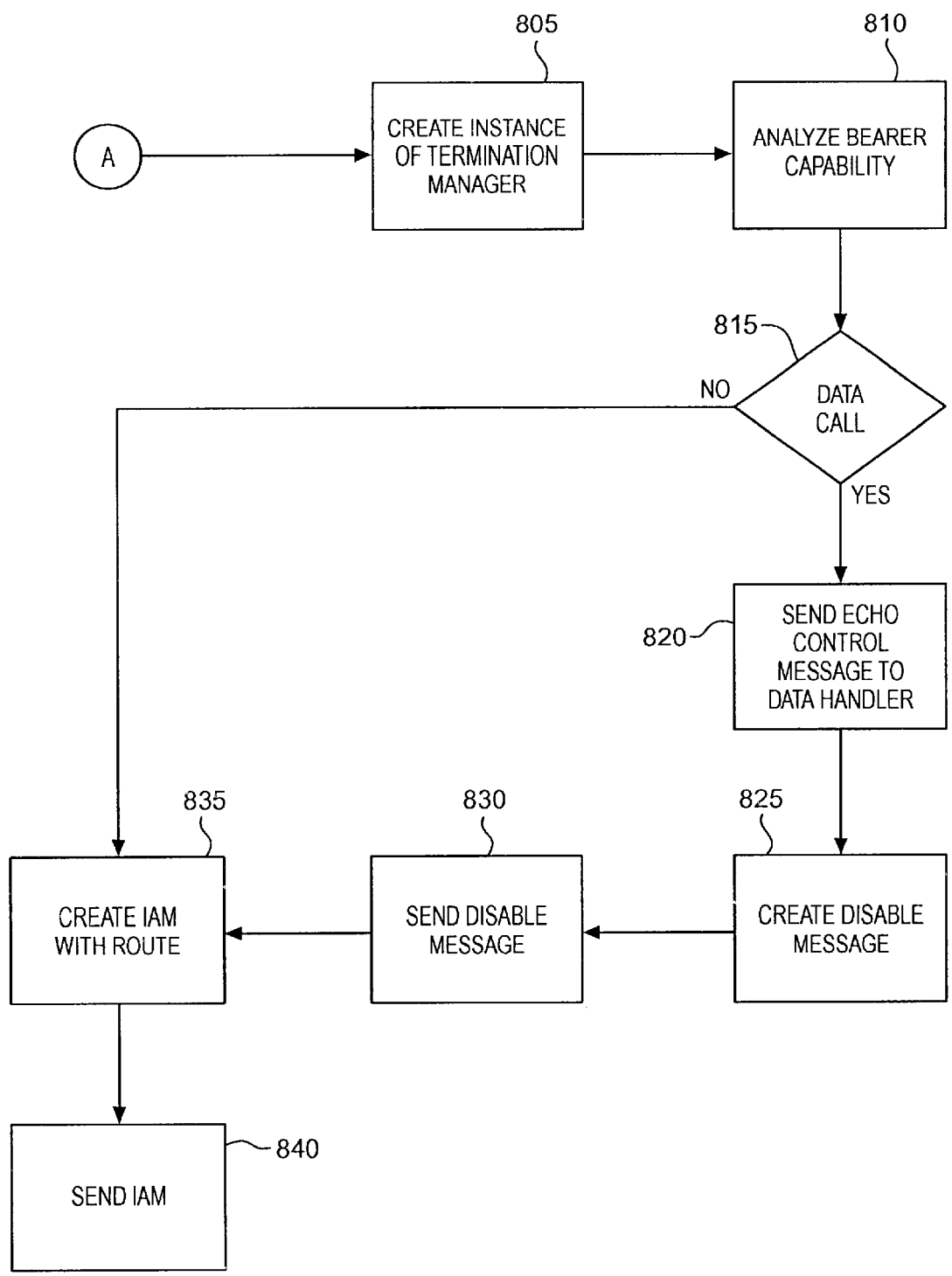
FIG. 8 depicts a flow diagram of a version of the invention.

FIG. 8 picks up processing at B after a route has been selected. A termination manager is created at 805. The termination manager is responsible for processing in accordance with the terminating BCSM of the ITU. However, in some embodiments, the processing can exhibit some deviation. For example, detection points such as select facility and validate call may be skipped.

The bearer capability is analyzed at 810 to determine if the call is a data call at 815. This analysis could occur elsewhere in the call processing (i.e by the origination manager after the route is selected.) If a data call is found at 815, an echo control message is sent to the data handler at 820. The disable message is created at 825 and is sent at 830. The echo cancellation instructions identify the route instruction selected for the call. The message could be sent to the echo canceller system over a conventional data link from the CCM to the echo canceller system.

If the call is not a data call at 815 or after echo canceller processing at 830, an IAM message is created at 835. The new IAM incorporates pertinent call processing information such as the selected route. The new IAM is sent to the platform handler at 840. Typically, the IAM will place the route instruction in the called number digits field. This means the digits may not represent the actual called number, but will contain other routing information recognizable by the network elements. The network elements would have to be capable of processing the routing instruction. The called number can be placed in another field in the IAM.

Figure 9:
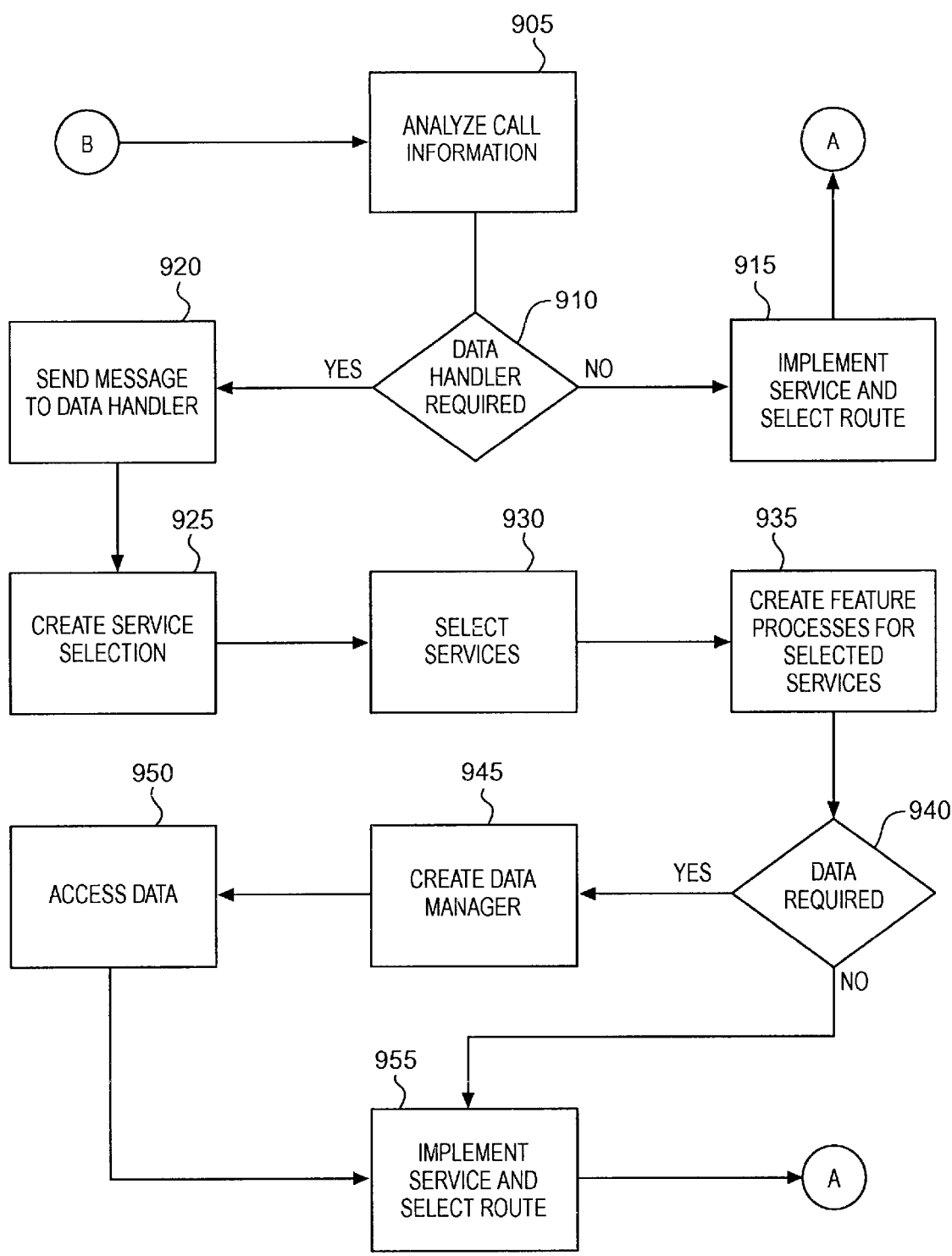
FIG. 9 depicts a flow diagram of a version of the invention.

FIG. 9 picks up the processing at B. At this point, several things are known about the call concerning authorization and service requirements. The call information is then analyzed at 905 as required to apply services to the call. If the data handler is not required at 910, the service is implemented and the route is selected at 915. This may occur if a service can be directly implemented by the origination manager or through the local resource. For example, particular 800 translations or dialed number service profiles (i.e call forwarding) can be stored in the local resource. In this case, route selection would be performed by the local resource after the information is analyzed to identify the correct entry to a local resource database. When the local resource is used, the messages must be routed from the detection point processor through the feature manager and switching manager to the local resource.

If the data handler is required for the call at 910, a message is sent to the data handler at 920. The messaging typically flows from the detection point processor to the feature manager and switching manager to the data handler. Upon receipt of the message at the data handler, the service control center creates an instance of the service selection process at 925. The service selection process analyzes the message from the detection point processor and selects the feature processes for the call at 930. For example, a call may be placed from a caller in a virtual private network (VPN) to a PCS number. In this case, both a VPN feature process and a PCS feature process would be created.

Each feature process would determine if data was required at 940. For example, a personal mobility feature process would need to access a database to locate the called party's current telephone number. If data is required at 940, the service data center creates a service data manager at 945. The data manager manages the data session and accesses the appropriate database at 950. After the data is collected (or none is needed), the service is implemented by the feature process at 955. For some features, i.e. 800 service, this may include route selection. The results of the feature process analysis are returned to the origination manager to assimilate. If the feature process does not provide the route, the origination manager must select the route through the local resource or through another feature process.

The IAM itself contains numerous fields of information. The following table describes the elements of an IAM with regard to the information content and call processing.

TABLE 1

Description of the Initial Address Message

| Parameter Field Name | Description |
|---|---|
| ROUTING LABEL | |
| Service Indicator | Set at 0101-ISDN user part |
| Priority | 0 or 1 based on destination |
| Network ID | 10 for national network or set based on international trunk group |
| Destination Point Code | Destination of IAM |
| Originating Point Code | Origination of IAM |
| Signaling Link Connection | Link used for messages (same for all messages for the call) |
| Circuit ID Code | Circuit used for the call between OPC and DPC in the IAM |
| Message Type | 0000 or 0001 for IAM |
| NATURE OF CONNECTION INDICATORS | |
| Satellite Indicator | Increment for each satellite used |
| Continuity Check Indicator | 00 - no check<br>01 - set up check and start COT timer<br>10 - start timer for COT message. |
| Echo Suppresser Indicator | Indicates if echo control already implemented or is set if echo control is implemented |
| FORWARD CALL INDICATORS | |
| National/International Call Indicator | 0 for domestic<br>1 for international |
| End to End Method Indicator | Pass any information |
| Interworking Indicator | Pass any information |
| IAM Segmentation Indicator | 0 for POTS |
| ISDN User Part Indicator | Pass any information |
| ISDN Preference Indicator | Pass any information and default to 00 |
| ISDN Access Indicator | Pass any information |
| SCCP Method Indicator | 00 |
| CALLING PARTIES CATEGORY | |
| Calling Party Category | 00000000 for unknown<br>00001010 for ordinary caller<br>00001101 for test call |
| USER SERVICE INFORMATION | |
| Information Transfer Capability | Pass any information unless destination requires particular settings, but always pass ISDN "unrestricted digital information" |
| Coding Standard | 00 |
| Extension | 1 |
| Information Transfer Rate | Pass any information (will be 10000 for POTS) |
| Transfer Mode | Set at 00 for 64 kbit/sec |
| Extension | 1 |
| User Layer Protocol Identification | Set based on rate adaption, typically 0100010 for user information layer 1 |
| Extension | 1 for normal calls<br>0 for rate adaption |
| Rate | Nothing for user information layer 1, but 0111 for other rate adaption |
| Extension | 1 |
| CALLED PARTY NUMBER | |
| Nature of Address Indicator | Identifies the type of call:<br>0000001 - original NPA or 950 call<br>0000011 - 1 + call<br>0000100 - direct dial international call<br>1110001 - operator call<br>1110010 - operator default<br>1110011 - international operator call<br>1110100 - long distance operator call<br>1110101 - cut through call<br>1110110 - 950, hotel/motel, or non equal access call<br>1110111 - test call |
| Odd/Even Numbering Plan | number of digits in a called number<br>000 - default<br>001 - for ISDN<br>101 - private |
| Digits Field | number of the called party |
| ACCESS TRANSPORT | |
| Access Transport Elements | pass any information |
| CALLING PARTY NUMBER | |
| Nature of Address Indicator | Indicates the type of calling party address, unique numbers can be used for billing, but the charge number is used for non-unique numbers:<br>0000000 - unknown<br>0000001 - unique caller number<br>0000011 - unique national number<br>0000100 - unique international number<br>1110001 - non-unique caller number<br>1110011 - non-unique national number<br>1110100 - non-unique international number<br>1110111 - test call |
| Odd/Even | Number of digits in the calling number |
| Screening | Not applicable |
| Presentation Allowed/Restricted | Pass any information for POTS, but restrict for N00 calls that are not allowed |
| Numbering Plan | 000 - default<br>001 - ISDN<br>101 - private |
| Digits Field | Number of the calling party |
| CARRIER IDENTIFICATION | |
| Network Identification Plan | Number of digits in identification code for the requested carrier |
| Type of Network Identification | Identifies the network numbering plan for the call - 010 for POTS call from LEC |
| Digit One | First digit in carrier identification code |
| Digit Two | Second digit in carrier identification code |
| Digit Three | Third digit in carrier identification code |
| Digit Four or Null | Fourth digit in carrier identification code (if there are four digits) |
| CARRIER SELECTION INFORMATION | |
| Carrier Selection Indicator | Indicates whether the carrier identification code was presubscribed or input |
| CHARGE NUMBER | |
| Nature of Address Indicator | This information may be used for billing.<br>00000001 - caller number<br>00000010 - no ANI, route to operator<br>00000011 - caller's national number<br>00000101 - route if 800, or route to operator<br>0000110 - no ANI<br>0000111 - route if 800 or route to operator |
| Odd/Even Numbering Plan | Number of digits in calling number<br>Pass any information |
| Digits Field | The number of calling party |
| GENERIC ADDRESS | |
| Nature of Address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |

TABLE 1-continued

Description of the Initial Address Message

| Parameter Field Name | Description |
|---|---|
| ORIGINATING LINE INFORMATION | |
| Originating Line Information | Identifies particular types of calls, for example:<br>00000000 - normal call<br>00000111 - call from a restricted phone<br>00111111 - call from a cellular roamer |
| ORIGINAL CALLED NUMBER | |
| Nature of address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |
| REDIRECTING NUMBER | |
| Nature of Address Indicator | Pass any information |
| Odd/Even | Pass any information |
| Screening | Pass any information |
| Presentation Allowed/Restricted | Pass any information |
| Numbering Plan | Pass any information |
| Digits Field | Pass any information |
| REDIRECTION INFORMATION | |
| Redirection Indicator | Pass any information |
| Original Redirecting Reason | Pass any information |
| Redirection Counter | Pass any information |
| Redirection Reason | Pass any information |

| SERVICE CODE | |
|---|---|
| Service Code | Pass any information |

| TRANSIT NETWORK SELECTION | |
|---|---|
| Network Identification Plan | Identifies the number of digits in the carrier identification code (3 or 4) |
| Type of Network Identification | Type of network identification for transit network parameter |
| Digits 1, 2, 3, 4 | Carrier identification code of the international transit carrier |
| Circuit Code | Indicates how the call was dialed:<br>0001 - international call, no operator requested<br>0010 - international call, operator requested |

| HOP COUNTER | |
|---|---|
| Hop Counter | limits the number of times an IAM may transfer through a signaling point. If the count reaches the limit, release the call |

The various fields in the message contain the pertinent information required to initiate call processing. IAM messages that are generated by the CCM could contain routing instructions. These could be placed in the called party number digits field. The called party number could be relocated in another field. The SSPs could then receive the IAM and route based on the routing instruction in the digits field. For example, the information could identify a routing code, telephone number, switch, trunk, platform, or network. A network element receiving such an IAM would recognize the routing instruction, such as a routing code, and provide the corresponding telecommunications service.

Subsequent ISUP Message Processing

The processing of the IAM is discussed above. Those skilled in the art are will appreciate how other SS7 messages can be incorporated into the processing of the present invention. For example, the time an address complete message (ACM) is received is recorded in the call control block for billing and maintenance. Triggers can also be based on receipt of subsequent messages, such as the ACM. The process for the answer message (ANM) is much the same.

Cut-through is the time point at which the users are able to pass information along the call connection from end to end. Messages from the CCM to the appropriate network elements are required to allow for cut-through of the call. Typically, call connections include both a transmit path from the caller and a receive path to the caller, and cut through is allowed on the receive path after the ACM is received and on the transmit path after the ANM is received.

Upon receipt of a release (REL) message, the CCM will write a time for the message to the call control block and check for triggers upon release (such as call re-originate). Additionally, any disabled echo canceller will be re-enabled, and the call control block will be used to create a billing record. Upon the receipt of a release complete message (RLC), the CCM will transmit messages directing tear down of the call path. It will clear its call specific processes and reuse the call connections for subsequent calls.

Additionally, suspend messages (SUS) and pass along messages (PAM) may be processed by the CCM. A suspend message (SUS) indicates that the called party has disconnected and a REL will follow if the called party does not re-connect with a specified time. A PAM is simply a message between signaling points and can contain a variety of information and be used for a variety of purposes.

Network Operation

Figure 10:
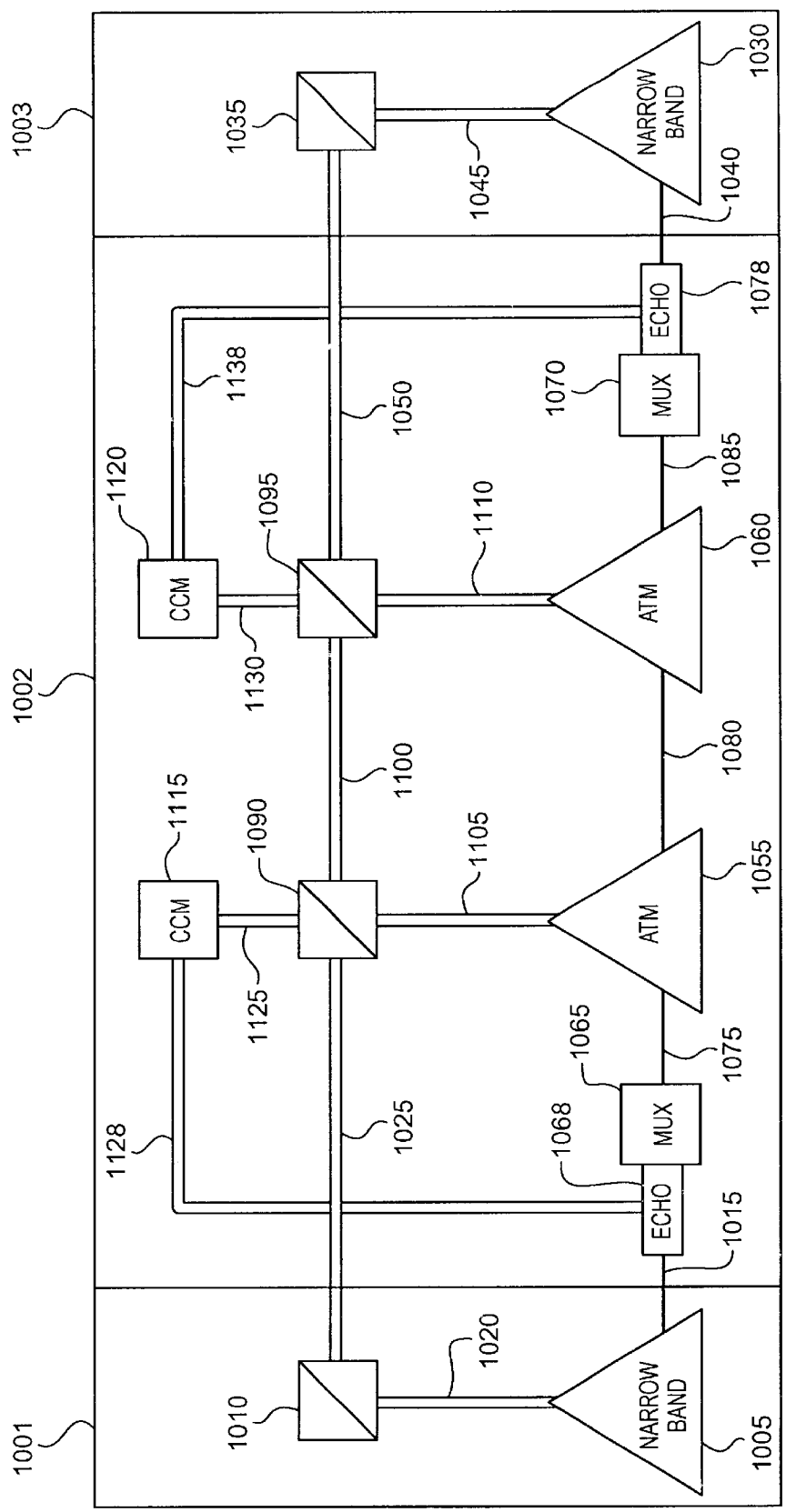
FIG. 10 depicts a block diagram of a version of the invention.

From the above discussion, it can be seen that the invention can receive and process an signaling to select connections for the call. The invention is also able to apply services during call processing. FIG. 10 shows a specific embodiment of the present invention with relation to a network, but the invention is applicable in other scenarios. Networks 1001, 1002, and 1003 are shown. Network 1001 is comprised of narrowband switch 1005 and signal transfer point (STP) 1010. Narrowband switch is connected to network 1002 by connection 1015. Narrowband switch is linked to STP 1010 by link 1020 and STP 1010 is linked to network 1002 by link 1025. Connection 1015 carries user traffic. Links 1020 and 1025 carry signaling messages. Narrowband switches, STPs, connections, and signaling links can take many various forms and are well known in the art. Network 1003 is similarly situated with narrowband switch 1030, STP 1035, connection 1040, link 1045, and link 1050.

Network 1002 is shown with ATM switch 1055, ATM switch 1060, mux 1065, mux 1070, echo control 1068, and echo control 1078. Mux 1065 is coupled to echo control 1068. Mux 1075 is coupled to echo control 1078. Echo control 1068 is connected to narrowband switch 1005 by connection 1015. Mux 1065 is connected to ATM switch 1055 by connection 1075. ATM switch 1055 is connected to ATM switch 1060 by connection 1080. ATM switch 1060 is connected to mux 1070 by connection 1085. Echo control 1078 is connected to narrowband switch 1030 by connection 1040. Also shown are STP 1090 and STP 1095. STP 1090 is linked to STP 1010 over link 1025. STP 1090 is linked to ATM switch 1055 by link 1105. STP 1090 is linked to STP 1095 by link 1100. STP 1095 is linked to ATM switch 1060 by link 1110. STP 1095 is linked to STP 1035 by link 1050. These components are all well known in the art.

Network 1002 also includes CCM 1115 and CCM 1120. CCM 1115 is linked to STP 1090 by link 1125 and to echo control 1068 by link 1128. CCM 1120 is linked to STP 1095 by link 1130 and to echo control 1078 by link 1138. The CCMs and associated links are configured to operate as described above with respect to the present invention. In operation, a call would proceed as follows.

Network 1001 would send a call to network 1002. This means switch 1005 would use connection 1015 to connect to network 1002. A signaling message would also be sent over link 1020 through STP 1010 and over link 1025 to network 1002. Network 1002 would receive the signaling message at STP 1090. The signaling message could be an SS7 ISUP message, and in particular and IAM. STP 1090 would route SS7 ISUP messages from switch 1005 to CCM 1115. It may be the case that the message was actually sent to a component other than CCM 1115, but was directed to CCM 1115 by network 1002. CCM 1115 would process the IAM. Processing could include validation, call information analysis, and route selection as described above. In turn, this may include POTS calls or calls requiring additional services such as N00, VPN, messaging, or personal/terminal mobility. In this embodiment, CCM 1115 might select connection 1080 as the route instruction for ATM switch 1055. An SS7 B-ISUP IAM would be formulated by CCM 1115 and sent to ATM switch 1055 over link 1125 through STP 1090 and over link 1105. ATM switch 1055 would accept the route instruction and select the specific VPI/VCI on connection 1080 and generate a B-ISUP IAM reflecting the selected VPI/VCI. Additionally, the route instruction from CCM 1115 could have identified the actual VPI, and left VCI selection to ATM switch 1055.

This IAM from ATM switch 1055 would be routed over link 1105 through STP 1090 and over link 1100 to STP 1095. STP 1095 would route this IAM over link 1130 to CCM 1120. CCM 1120 would process the B-ISUP IAM and select network 1003, and in particular, connection 1085 and/or switch 1030 as the route instruction for switch 1060. A B-ISUP IAM would be formulated by CCM 1120 and sent to switch 1060 over link 1130 through STP 1095 and over link 1110. ATM switch 1060 would select the proper VPI/VCI (or possibly only the VCI) on connection 1085 and generate a B-ISUP message reflecting the selection. This B-ISUP message would be routed over link 1110 through STP 1095 and over link 1130 to CCM 1120. CCM 1120 would process the B-ISUP IAM to create an ISUP IAM for narrowband switch 1030. The ISUP IAM would be sent to switch 1030 over link 1130, through STP 1095, over link 1050, through STP 1035, and over link 1045. Muxes 1065 and 1070 convert the traffic between narrowband format and ATM format. The CCM tracks these connections through the muxes so it can equate narrow band connections and ATM connections on each side of a given mux.

CCM 1115 would check the IAM to determine if the call is a data call. If so, the echo canceller on the selected connection would need disabled. This would be accomplished by a message from CCM 1115 to echo control 1068 over link 1128. The same procedure would occur between CCM 1120 and echo control 1078 over link 1138.

Narrowband switch 1030 will typically produce an address complete message (ACM) to signify the called party is being alerted and an answer message (ANM) to signify the called party has answered. These messages are routed back to network 1002 and to CCM 1120. CCM 1120 and CCM 1115 instruct switches 1055 and 1060 to allow cut-through on the selected connections and will signal network 1001 of the call status. When a party terminates the call, suspend (SUS), release (REL), and release complete (RLC) messages are transmitted by networks 1001 and 1003 as appropriate in order to tear down the call. CCM 1115 and CCM 1120 will process these messages and instruct switch 1055 and switch 1060 to use those VPI/VCIs for other calls. At this time each CCM will generate billing information for the call.

The invention provides several advantages over prior systems. The invention is not coupled to a switching matrix and thus, it is not dependent on the capabilities bundled with a switch by the switch provider. The invention does not accept actual user traffic and is not required to have transport capability. However, the invention does accept the signaling that a switch would receive, processes the signaling, and provides a switch with a new signal that incorporates the processing. The processing can implement routing, billing, and special services so the switch does not need to have the capabilities. The processing can also interwork different signaling types so each switch receives signaling in its own format.

Current signaling processors cannot provide these advantages. SCPs process TCAP message queries and do not process call set-up messages sent from a user. SCPs process queries generated by a switch and respond to that same switch. SCPs must be invoked by a switch and respond to that switch.

Signaling points and their associated switch CPUs are bundled with the switch and the switch CPU is coupled to a switch matrix. The added functionality of this system increases its cost and reduces its flexibility.

Another proposed signaling processing system is logically segregated according to call, service, connection, and channel. As such, it must rely on a proprietary signaling protocol to communicate among the logically segregated components. This system does not provide a single logical component that processes signaling and generates signaling for a network element connected to the communication path.

Those skilled in the art will appreciate variations that will support the requirements of the invention. As such, the invention should not be restricted to only the embodiments listed above. The invention should only be defined by the following claims.

What is claimed is:

1. An Asynchronous Transfer Mode (ATM) communications system comprising:

an ATM multiplexer configured to receive user communications, convert the user communications into ATM communications, and transfer the ATM communications;

an ATM switch configured to receive a control message, receive the ATM communications, and transfer the ATM communications over a selected ATM connection in response to the control message; and a processor that is external to the ATM switch and configured to receive information related to the user communications, process the information to select the ATM connection, generate the control message that identifies the selected ATM connection, and transmit the control message.

2. The communication system of claim 1 wherein the information is a call set-up signaling message and the processor is further configured to process the call set-up signaling message to select echo cancellation for the user communications, generate an echo cancellation instruction, and transmit the echo cancellation instruction.

3. The method of claim 2 further comprising an echo canceller configured to receive the echo cancellation instruction, receive the user communications, cancel echo in the user communications in response to the echo cancellation instruction, and transfer the user communications after canceling the echo.

4. The communication system of claim 2 wherein the call set-up signaling message is an initial address message.

5. The communication system of claim 4 wherein the processor is further configured to receive and process a release message.

6. The communication system of claim 5 wherein the processor is further configured to receive and process an answer message.

7. The communication system of claim 6 wherein the processor is further configured to receive and process an address complete message.

8. The communication system of claim 7 wherein the processor is further configured to receive and process a release complete message.

9. The communication system of claim 2 wherein the processor is further configured to process a called number from the call set-up signaling message to select the ATM connection.

10. The communication system of claim 9 wherein the called number is an 800 type number.

11. The communication system of claim 9 wherein the called number is a virtual private network number.

12. The communication system of claim 9 wherein the called number is a mobile number.

13. The communication system of claim 2 wherein the processor is further configured to process the call set-up signaling message to validate a call.

14. The communication system of claim 2 wherein the processor is further configured to process an automatic number identification in the call set-up signaling message to select the ATM connection.

15. The communication system of claim 2 wherein the processor is further configured to process a signaling link selection code in the call set-up signaling message to select the ATM connection.

16. The communication system of claim 1 wherein the processor is further configured to generate billing information for the ATM communications.

17. A method for using an Asynchronous Transfer Mode (ATM) communications system, the method comprising:
receiving information related to user communications into a processor that is external to an ATM switch;
processing the information to select an ATM connection;
generating a control message that identifies the selected ATM connection;
transmitting the control message from the processor;
receiving the control message into the ATM switch;
receiving the user communications into an ATM multiplexer;
converting the user communications into ATM communications;
transferring the ATM communications from the ATM multiplexer;
receiving the ATM communications into the ATM switch; and
transferring the ATM communications from the ATM switch over the selected ATM connection in response to the control message.

18. The method of claim 17 wherein the information is call set-up signaling message and further comprising:
processing the call set-up signaling message to select echo cancellation for the user communications;
generating an echo cancellation instruction; and
transmitting the echo cancellation instruction from the processor.

19. The method of claim 18 further comprising:
receiving the echo cancellation instruction into an echo canceller;
receiving the user communications into the echo canceller;
canceling echo in the user communications; and
transferring the user communications from the echo canceller after canceling the echo.

20. The method of claim 18 wherein the call set-up signaling message is an initial address message.

21. The method of claim 20 further comprising receiving a release message into the processor and processing the release message.

22. The method of claim 21 further comprising receiving an answer message into the processor and processing the answer message.

23. The method of claim 22 further comprising receiving an address complete message into the processor and processing the address complete message.

24. The method of claim 23 further comprising receiving a release complete message into the processor and processing the release complete message.

25. The method of claim 18 wherein processing the call set-up signaling message to select the ATM connection comprises processing a called number.

26. The method of claim 25 wherein processing the called number comprises processing an 800 type number.

27. The method of claim 25 wherein processing the called number comprises processing called party mobility information.

28. The method of claim 25 wherein processing the called number comprises processing a virtual private network number.

29. The method of claim 18 wherein processing the call set-up signaling message to select the ATM connection comprises validating a call.

30. The method of claim 18 wherein processing the call set-up signaling message to select the ATM connection comprises processing an automatic number identification.

31. The method of claim 18 wherein processing the call set-up signaling message to select the ATM connection comprises processing a signaling link selection code.

32. The method of claim 17 further comprising generating billing information for the ATM communications in the processor.

* * * * *